(12) United States Patent
Tabata

(10) Patent No.: US 8,470,428 B2
(45) Date of Patent: Jun. 25, 2013

(54) OPTICAL RECORDING MEDIUM

(75) Inventor: Hiroshi Tabata, Miyagi (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 13/178,569

(22) Filed: Jul. 8, 2011

(65) Prior Publication Data

US 2012/0015133 A1  Jan. 19, 2012

(30) Foreign Application Priority Data

Jul. 15, 2010  (JP) ................................. 2010-161092

(51) Int. Cl.
*G11B 7/24* (2006.01)

(52) U.S. Cl.
USPC ....... 428/64.1; 428/64.4; 428/64.5; 428/64.6; 430/270.13

(58) Field of Classification Search
USPC ...................... 428/64.4; 430/270.13
See application file for complete search history.

(56) References Cited

U.S. PATENT DOCUMENTS

| | | | |
|---|---|---|---|
| 6,938,267 B2 | 8/2005 | Kikuchi et al. | |
| 8,133,566 B2 * | 3/2012 | Nishihara et al. | 428/64.1 |
| 2009/0268579 A1 * | 10/2009 | Miyawaki et al. | 369/100 |
| 2010/0187099 A1 | 7/2010 | Wada | |

FOREIGN PATENT DOCUMENTS

| | | |
|---|---|---|
| JP | 2003-059106 | 2/2003 |
| JP | 2009-129526 | 6/2009 |

\* cited by examiner

*Primary Examiner* — Elizabeth Mulvaney
(74) *Attorney, Agent, or Firm* — Dentons US LLP

(57) ABSTRACT

An optical recording medium includes an inorganic recording layer, a first protective layer provided on at least one surface of the inorganic recording layer and containing indium oxide, and a second protective layer provided so as to be adjacent to the first protective layer and containing titanium oxide, zirconium oxide, or tin oxide.

13 Claims, 5 Drawing Sheets

OPTICAL RECORDING MEDIUM

BACKGROUND

The present disclosure relates to an optical recording medium. More specifically, the present disclosure relates to an optical recording medium including an inorganic recording layer.

Hitherto, Compact Discs (CDs), Digital Versatile Discs (DVDs), and the like have led the market of optical recording media. However, recently, with a realization of high-vision televisions and a rapid increase in the volume of data handled by personal computers (PCs), a further increase in the capacity of optical recording media has been desired. In order to meet this desire, large-capacity optical recording media for a blue laser, such as Blu-ray Discs (BDs) (registered trademark), have appeared, and a new market of large-capacity optical recording media has been established.

Recordable optical recording media include rewritable optical recording media typified by a Digital Versatile Disc-Recordable (DVD-R) and a Digital Versatile Disc±ReWritable (DVD±RW), and write-once optical recording media typified by a Compact Disc-Recordable (CD-R) and a Digital Versatile Disc-Recordable (DVD-R). In particular, the latter write-once optical recording media have made a large contribution to the market expansion as low-price media. Accordingly, in order to expand the market also in large-capacity optical recording media for a blue laser, it is necessary to reduce the price of the write-once optical recording media. Furthermore, in general, it is believed that optical recording media have high storage reliability from the standpoint of the principle of recording and reproduction thereof, as compared with hard disk drives (HDDs) and flash memories. For example, optical recording media have started to be used for storing important information, and thus a demand for optical recording media as archival media has been recently increasing.

In write-once optical recording media, both inorganic materials and organic dye materials are permitted as recoding materials. Write-once optical recording media including an organic material are advantageous in that they can be produced by a spin coating method at a low cost. On the other hand, write-once optical recording media including an inorganic material are advantageous in that they are good in terms of reproduction durability and formation of multiple recording layers, but are disadvantageous in that a large sputtering apparatus is necessary. Accordingly, in order that such write-once optical recording media including an inorganic material can be competitive with write-once optical recording media including an organic material in terms of cost, it is necessary to suppress the initial investment for a production apparatus, to improve the production takt per disc, and to efficiently produce the recording media.

An example of the most effective method for solving the above problem is reducing the number of layers constituting a recording film to reduce the number of deposition chambers, thus reducing the initial investment for a sputtering apparatus and reducing the production takt. However, even when the number of layers is simply reduced, if a film having a large thickness is deposited using a material whose deposition rate is low, the production takt increases, which may actually result in an increase in the cost.

Hitherto, transparent dielectric materials such as SiN and ZnS—$SiO_2$ have been mainly used as materials of protective layers of write-once optical recording media including an inorganic material (refer to, for example, Japanese Unexamined Patent Application Publication No. 2003-59106). Although SiN and ZnS—$SiO_2$ are advantageous in that the deposition rates thereof are high and thus these materials are good in terms of productivity, these materials have a problem of a poor storage characteristic (storage reliability) of recorded data. Some dielectric materials other than the above materials have high storage reliability. However, it is necessary to deposit these dielectric materials by radio-frequency (RF) sputtering, and thus the deposition rates thereof are very low. Thus, these dielectric materials have a problem of low productivity. Thus, it is very difficult to satisfy both high storage reliability and productivity.

To solve this problem, for example, Japanese Unexamined Patent Application Publication No. 2009-129526 has proposed a technology of using, as a material of a protective layer, indium oxide and tin oxide (hereinafter referred to as "ITO"), which can be deposited by direct-current (DC) sputtering. In this technology, high storage reliability can be realized in write-once optical recording media, and the number of deposition chamber can be reduced to achieve high productivity. Specifically, since a high deposition rate can be achieved by using ITO as a material of the protective layer, the thickness of the protective layer can be increased even in a single chamber. As a result, the number of chambers can be reduced while maintaining the degree of freedom of the design of the optical recording media.

In the technology described in Japanese Unexamined Patent Application Publication No. 2009-129526, it is possible to realize storage reliability at a sufficient level in daily use. However, a higher level of storage reliability has been recently desired. It is difficult for the above technology to meet this desire.

SUMMARY

It is desirable to provide a write-once optical recording medium that can achieve higher storage reliability than that in the case where a single protective layer containing indium oxide is used, while high productivity is maintained.

As a result of intensive studies, the inventor of the present disclosure found that higher storage reliability can be realized while maintaining high productivity by using a material containing indium oxide as a material of a first protective layer and using a material containing titanium oxide, zirconium oxide, or tin oxide as a material of a second protective layer that is adjacent to the first protective layer, and also experimentally demonstrated this finding. The present disclosure was conceived on the basis of these finding and demonstration.

According to an embodiment of the present disclosure, there is provided an optical recording medium including an inorganic recording layer, a first protective layer provided on at least one surface of the inorganic recording layer and containing indium oxide, and a second protective layer provided so as to be adjacent to the first protective layer and containing titanium oxide, zirconium oxide, or tin oxide.

According to this embodiment of the present disclosure, since the first protective layer containing indium oxide whose deposition rate is high is provided on at least one surface of the inorganic recording layer, high storage reliability can be obtained while maintaining high productivity. In addition, since the second protective layer containing titanium oxide, zirconium oxide, or tin oxide is further provided so as to be adjacent to the first protective layer, higher storage reliability can be obtained.

As described above, according to an embodiment of the present disclosure, high storage reliability can be obtained as compared with the case where a single protective layer containing indium oxide is provided, while high productivity is maintained.

DETAILED DESCRIPTION OF EMBODIMENTS

Embodiments of the present disclosure will now be described with reference to the drawings.

1. First Embodiment

Example of Single-Layer Write-Once Optical Recording Medium

[Configuration of Write-Once Optical Recording Medium]

Figure 1:
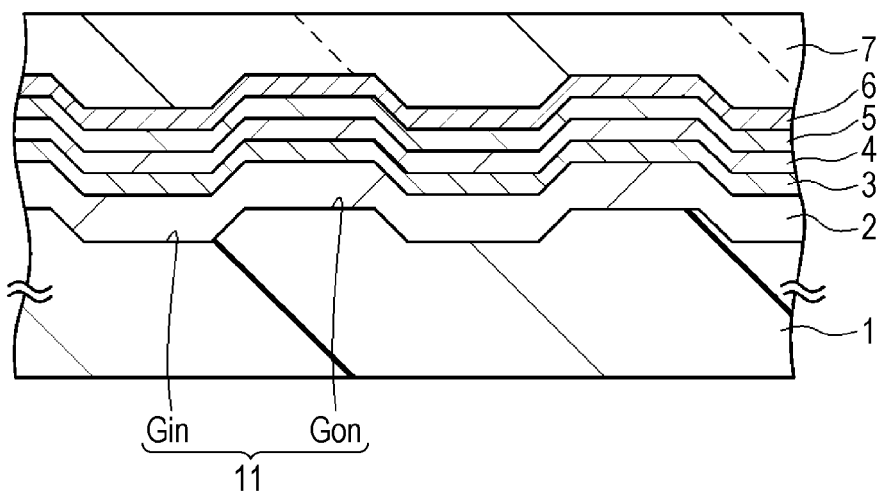
FIG. 1 is a schematic cross-sectional view illustrating a configuration example of a write-once optical recording medium according to a first embodiment of the present disclosure.

FIG. 1 is a schematic cross-sectional view illustrating a configuration example of a write-once optical recording medium according to a first embodiment of the present disclosure. As illustrated in FIG. 1, a write-once optical recording medium 10 has a configuration in which a reflective layer 2, a third protective layer 3, an inorganic recording layer 4, a first protective layer 5, a second protective layer 6, and a light-transmissive layer 7 are sequentially stacked on a substrate 1.

In the write-once optical recording medium 10 according to this first embodiment, an information signal is recorded or reproduced by applying a laser beam from the light-transmissive layer 7 side to the inorganic recording layer 4. For example, an information signal is recorded or reproduced by focusing a laser beam having a wavelength in the range of 400 nm to 410 nm with an objective lens having a numerical aperture in the range of 0.84 to 0.86 and applying the laser beam from the light-transmissive layer 7 side to the inorganic recording layer 4. An example of such a write-once optical recording medium 10 is a Blu-ray Disc Recordable (BD-R).

The substrate 1, the reflective layer 2, the third protective layer 3, the inorganic recording layer 4, the first protective layer 5, the second protective layer 6, and the light-transmissive layer 7, all of which constitute the write-once optical recording medium 10, will now be sequentially described.

(Substrate)

The substrate 1 has, for example, a ring shape having an opening (hereinafter referred to as "center hole") at the center thereof. One main surface of this substrate 1 is an uneven surface 11, and the inorganic recording layer 4 is deposited on this uneven surface 11. Hereinafter, a recessed portion of the uneven surface 11 is referred to as in-groove $G_{in}$, and a projecting portion of the uneven surface 11 is referred to as on-groove $G_{on}$.

Examples of the shape of the in-groove $G_{in}$ and the on-groove $G_{on}$ include various shapes such as a spiral shape and a concentric circle. The in-groove $G_{in}$ and/or the on-groove $G_{on}$ is wobbled in order to, for example, add address information.

The diameter of the substrate 1 is selected to be, for example, 120 mm. The thickness of the substrate 1 is selected in consideration of the rigidity, and is selected to be preferably in the range of 0.3 mm to 1.3 mm, more preferably in the range of 0.6 mm to 1.3 mm, and, for example, 1.1 mm. The diameter of the center hole is selected to be, for example, 15 mm.

For example, a plastic material or glass can be used as the material of the substrate 1. From the standpoint of the cost, a plastic material is preferably used. Examples of the plastic material include polycarbonate resins, polyolefin resins, and acrylic resins.

(Reflective Layer)

As the material of the reflective layer 2, a metal, a semi-metal, or the like that can be typically used in optical discs in the related art, for example, a Ag alloy, an Al alloy, or the like can be selected and used in accordance with characteristics desired for the reflective layer 2. Furthermore, as for the material of the reflective layer 2, a material having a heat sink (heat dissipation) capacity in addition to a light-reflecting capacity is preferably used. In such a case, a function of a heat dissipation layer can also be provided to the reflective layer 2.

(First Protective Layer and Third Protective Layer)

The first protective layer 5 and the third protective layer 3 are layers for protecting the inorganic recording layer 4 and controlling optical characteristics and heat characteristics during recording/reproduction. At least one of the first protective layer 5 and the third protective layer 3 contains, as a main component, a compound oxide containing indium oxide. At least one of the first protective layer 5 and the third protective layer 3 preferably contains, as a main component, a compound oxide of indium oxide and tin oxide (indium tin oxide, hereinafter, also referred to as "ITO"), a compound oxide of indium oxide and cerium oxide (indium cerium oxide, hereinafter, also referred to as "ICO"), or a compound oxide of indium oxide and gallium oxide (indium gallium oxide, hereinafter, also referred to as "IGO"). With this configuration, both storage reliability and high productivity can be achieved. In particular, both the first protective layer 5 and the third protective layer 3 preferably contain ITO, ICO, or IGO as a main component. As materials other than ITO, ICO, and IGO, dielectric materials that can be typically used in optical discs in the related art, such as SiN, ZnS—$SiO_2$, and $Ta_2O_5$ can also be used. The average thickness of the third protective layer 3 is preferably 10 to 40 nm and more preferably 20 to 30 nm in order to obtain an appropriate reflectivity. The average thickness of the first protective layer 5 is preferably 11 to 34 nm and more preferably 16 to 30 nm in combination with the second protective layer 6 from the standpoint of an improvement of a recording power margin.

The compound oxide containing indium oxide preferably has a composition represented by formula (1) below.

$$[(In_2O_3)_{1-x}(A)_x] \quad (1)$$

In formula (1), A is preferably tin oxide, cerium oxide, or gallium oxide. From the standpoint of obtaining good storage reliability, X preferably satisfies $0.05 \leqq X \leqq 0.75$, more preferably $0.05 \leqq X \leqq 0.65$, and still more preferably $0.10 \leqq X \leqq 0.40$.

From the standpoint of obtaining good storage reliability and improving productivity in terms of, for example, nodule resistance, A is preferably cerium oxide or gallium oxide. In this case, X preferably satisfies $0.15 \leqq X \leqq 0.75$, more preferably $0.15 \leqq X \leqq 0.65$, and still more preferably $0.15 \leqq X \leqq 0.40$.

(Second Protective Layer)

The second protective layer 6 is a layer that further improves storage reliability. From the standpoint of preventing moisture and oxygen, which become a cause of impairing storage reliability, from passing through the second protective layer 6, the second protective layer 6 is preferably a thin film that has no grain boundaries therein. Preferable examples of such a material include materials containing titanium oxide, zirconium oxide, or tin oxide. Specifically, examples thereof preferably include materials containing, as a main component, titanium oxide; a compound oxide of zirconium oxide, silicon oxide, and indium oxide (hereinafter, also referred to as SIZ); and a compound oxide of tin oxide and tantalum oxide (hereinafter, also referred to as TTO). The second protective layer 6 preferably has an average thickness in the range of 2 nm or more and 10 nm or less. When the average thickness of the second protective layer 6 exceeds 10 nm, the productivity tends to decrease because the sputtering rates of the above materials are lower than those of ITO, ICO, and IGO. On the other hand, when the average thickness of the second protective layer 6 is less than 2 nm, the effect of improving storage reliability tends to decrease.

When the second protective layer 6 contains titanium oxide, the content of titanium oxide in the second protective layer 6 is preferably 40% by mole or more and 100% by mole or less, and more preferably 70% by mole or more and 100% by mole or less. In this case, good storage reliability can be obtained. When the second protective layer 6 contains, as a main component, a compound oxide of titanium oxide and silicon oxide, the second protective layer 6 preferably has a composition that satisfies formula (2):

$$(TiO_2)_x(SiO_2)_{1-x} \quad (2)$$

wherein x preferably satisfies $0.4 \leqq x \leqq 1.0$ and more preferably $0.7 \leqq x \leqq 1.0$.

When the second protective layer 6 contains zirconium oxide, the content of zirconium oxide in the second protective layer 6 is preferably 20% by mole or more and 70% by mole or less, and more preferably 20% by mole or more and 50% by mole or less. In this case, good storage reliability can be obtained. When the second protective layer 6 contains, as a main component, a compound oxide of zirconium oxide, silicon oxide, and indium oxide, the second protective layer 6 preferably has a composition that satisfies formula (3):

$$(SiO_2)_x(In_2O_3)_y(ZrO_2)_z \quad (3)$$

wherein $x+y+z=1.0$, x preferably satisfies $0.1 \leqq x \leqq 0.6$ and more preferably $0.2 \leqq x \leqq 0.5$, y preferably satisfies $0.2 \leqq y \leqq 0.7$ and more preferably $0.3 \leqq y \leqq 0.6$, and z preferably satisfies $0.2 \leqq z \leqq 0.7$ and more preferably $0.2 \leqq z \leqq 0.5$.

When the second protective layer 6 contains tin oxide, the content of tin oxide in the second protective layer 6 is preferably 20% by mole or more and 100% by mole or less, and more preferably 40% by mole or more and 100% by mole or less. In this case, good storage reliability can be obtained. When the second protective layer 6 contains, as a main component, a compound oxide of tin oxide and tantalum oxide, the second protective layer 6 preferably has a composition that satisfies formula (4):

$$(Sn_2O_3)_x(Ta_2O_5)_{1-x} \quad (4)$$

wherein x preferably satisfies $0.2 \leqq x \leqq 1.0$ and more preferably $0.4 \leqq x \leqq 1.0$.

(Inorganic Recording Layer)

The inorganic recording layer 4 is a write-once inorganic recording layer. This inorganic recording layer 4 contains, for example, ZnS, SiO$_2$, and Sb as main components, further contains at least one element selected from the group consisting of Zn, Ga, Te, V, Si, Ta, Ge, In, Cr, Sn, and Tb according to need, and preferably has a composition represented by formula (5):

$$[(ZnS)_x(SiO_2)_{1-x}]_y(Sb_zX_{1-z})_{1-y} \quad (5)$$

wherein $0 < x \leqq 1.0$, $0.3 \leqq y \leqq 0.7$, and $0.8 < z \leqq 1.0$, and X is at least one element selected from the group consisting of Ga, Te, V, Si, Zn, Ta, Ge, In, Cr, Sn, and Tb.

From the standpoint that good recording and reproducing characteristics are obtained, the inorganic recording layer 4 preferably has an average thickness of 3 nm or more and 40 nm or less. In the inorganic recording layer 4 containing ZnS, SiO$_2$, and Sb as main components, ZnS, SiO$_2$, and Sb are in an amorphous state before recording. When the inorganic recording layer 4 in such an amorphous state is irradiated with a laser beam, crystals of Sb are formed in a central portion of the inorganic recording layer 4 and other atoms concentrate in the vicinity of the interface. Consequently, optical constants (n: refractive index, k: extinction coefficient) change, and an information signal is recorded. It is difficult to return the inorganic recording layer 4, in which the crystals of Sb have been thus formed in the central portion, to the amorphous state before recording. Therefore, the inorganic recording layer 4 described above is used as a write-once inorganic recording layer.

As described above, when the inorganic recording layer 4 contains ZnS, SiO$_2$, and Sb as main components and preferably has a composition represented by formula (5) above, recorded information is stably stored for a long period of time in the initial state, signals are not impaired by a laser beam for reproduction during the reproduction of the signals, the quality of the inorganic recording layer 4 is not changed in ordinary long-term storage and therefore writing characteristics are maintained, and a sufficient sensitivity and rate of reaction can be obtained for a laser beam for recording and/or reproduction. Accordingly, good recording and reproducing characteristics can be obtained over wide ranges of linear velocity and recording power.

The material of the inorganic recording layer 4 is not limited to the material described above. Other inorganic recording materials that can be typically used in write-once optical recording media in the related art can also be used.

As the inorganic recording layer 4, for example, a phase-change-type inorganic recording layer containing Te (tellurium), Pd (palladium), and O (oxygen) as main components can be used. This inorganic recording layer has, for example, a composition represented by formula (6):

$$(Te_xPd_{1-x})_yO_{1-y} \quad (6)$$

wherein $0.7 \leqq x \leqq 0.9$ and $0.3 \leqq y \leqq 0.7$.

Alternatively, for example, the inorganic recording layer 4 may be an alloy-type inorganic recording layer in which a silicon (Si) layer and a copper (Cu) alloy layer are stacked, or an inorganic recording layer containing germanium (Ge), bismuth (Bi), and nitrogen (N) as main components.

(Light-Transmissive Layer)

The light-transmissive layer 7 includes, for example, a light-transmissive sheet having a ring shape and an adhesive layer for bonding the light-transmissive sheet to the substrate 1. The light-transmissive sheet is preferably composed of a material having a low absorptivity of a laser beam used in recording and/or reproduction, and more specifically, preferably composed of a material having a transmittance of 90% or more. Examples of the material of the light-transmissive sheet include polycarbonate resin materials and polyolefin resins (for example, ZEONEX (registered trademark)). The thickness of the light-transmissive sheet is preferably selected to be 0.3 mm or less, and more preferably, selected from the range of 3 to 177 µm. The adhesive layer is composed of, for example, an ultraviolet-curable resin or a pressure-sensitive adhesive (PSA). Alternatively, the light-transmissive layer 7 may be a resin cover formed by curing a photosensitive resin such as a UV resin. Examples of the material of the resin cover include ultraviolet-curable acrylic resins and urethane resins.

The thickness of the light-transmissive layer 7 is preferably selected from the range of 10 to 177 µm, and selected to be, for example, 100 µm. Combination of such a thin light-transmissive layer 7 with an objective lens having a high NA (numerical aperture) of, for example, about 0.85 can achieve a high-density recording.

[Method for Producing Write-Once Optical Recording Medium]

Next, an example of a method for producing a write-once optical recording medium according to the first embodiment of the present disclosure will be described.

(Step of Forming Substrate)

First, a substrate 1 a main surface of which has an uneven surface 11 is formed. Examples of the method for forming the substrate 1 include an injection molding (injection) method and a photopolymer method (2P-method: photo-polymerization).

(Step of Depositing Reflective Layer)

Next, the substrate 1 is transferred to a vacuum chamber equipped with a target containing, for example, a Ag alloy or an Al alloy as a main component, and the vacuum chamber is evacuated until the pressure in the vacuum chamber reaches a certain value. The target is then sputtered while introducing a process gas such as Ar gas in the vacuum chamber to deposit a reflective layer 2 on the substrate 1.

(Step of Depositing Third Protective Layer)

Next, the substrate 1 is transferred to a vacuum chamber equipped with a target containing, for example, ITO, ICO, or IGO as a main component, and the vacuum chamber is evacuated until the pressure in the vacuum chamber reaches a certain value. The target is then sputtered while introducing a process gas such as Ar gas or $O_2$ gas in the vacuum chamber to deposit a third protective layer 3 on the reflective layer 2. As a sputtering method, for example, a radio-frequency (RF) sputtering method or a direct-current (DC) sputtering method can be employed, but the direct-current sputtering method is particularly preferable. This is because the deposition rate in the direct-current sputtering method is higher than that in the radio-frequency sputtering method, and thus productivity can be improved.

(Step of Depositing Inorganic Recording Layer)

Next, the substrate 1 is transferred to a vacuum chamber equipped with a target containing, for example, ZnS, $SiO_2$, and Sb as main components, and the vacuum chamber is evacuated until the pressure in the vacuum chamber reaches a certain value. The target is then sputtered while introducing a process gas such as Ar gas in the vacuum chamber to deposit an inorganic recording layer 4 on the third protective layer 3.

(Step of Depositing First Protective Layer)

Next, the substrate 1 is transferred to a vacuum chamber equipped with a target containing, for example, ITO, ICO, or IGO as a main component, and the vacuum chamber is evacuated until the pressure in the vacuum chamber reaches a certain value. The target is then sputtered while introducing a process gas such as Ar gas or $O_2$ gas in the vacuum chamber to deposit a first protective layer 5 on the inorganic recording layer 4. As a sputtering method, for example, a radio-frequency (RF) sputtering method or a direct-current (DC) sputtering method can be employed, but the direct-current sputtering method is particularly preferable. This is because the deposition rate in the direct-current sputtering method is higher than that in the radio-frequency sputtering method, and thus productivity can be improved.

(Step of Depositing Second Protective Layer)

Next, the substrate 1 is transferred to a vacuum chamber equipped with a target containing, for example, titanium oxide, SIZ, or TTO, as a main component, and the vacuum chamber is evacuated until the pressure in the vacuum chamber reaches a certain value. The target is sputtered while introducing a process gas such as Ar gas or $O_2$ gas in the vacuum chamber to deposit a second protective layer 6 on the first protective layer 5. As a sputtering method, for example, a radio-frequency (RF) sputtering method or a direct-current (DC) sputtering method can be employed, but the direct-current sputtering method is particularly preferable. This is because the deposition rate in the direct-current sputtering method is higher than that in the radio-frequency sputtering method, and thus productivity can be improved.

(Step of Forming Light-Transmissive Layer)

Next, a light-transmissive layer 7 is formed on the second protective layer 6. Examples of a method for forming the light-transmissive layer 7 include a resin coating method in which a photosensitive resin such as an ultraviolet-curable resin (UV resin) is spin-coated on the second protective layer 6, and the photosensitive resin is then irradiated with light such as UV light to form the light-transmissive layer 7, and a sheet bonding method in which a light-transmissive sheet is boned on the uneven surface 11 side of the substrate 1 with an adhesive to form the light-transmissive layer 7. Examples of this sheet bonding method include a sheet-resin bonding method in which the light-transmissive layer 7 is formed by bonding a light-transmissive sheet on the uneven surface 11 side of the substrate 1 with a photosensitive resin such as a UV resin applied on the second protective layer 6; and a sheet-PSA bonding method in which the light-transmissive layer 7 is formed by bonding a light-transmissive sheet on the uneven surface 11 side of the substrate 1 with a pressure-sensitive adhesive (PSA) that has been uniformly applied on a main surface of the light-transmissive sheet in advance. The write-once optical recording medium 10 shown in FIG. 1 is obtained through the steps described above.

Modification

A heat storage layer may further be provided between the third protective layer 3 and the inorganic recording layer 4. In this case, a laser beam for recording and/or reproduction is applied from the side opposite the heat storage layer to the inorganic recording layer 4. The heat storage layer has a thermal conductivity lower than that of the third protective layer 3 and contains, as a main component, a dielectric material such as ZnS—SiO$_2$. The heat storage layer functions as a heat storage layer that holds heat generated during recording in the inorganic recording layer 4. Accordingly, by forming the heat storage layer between the third protective layer 3 and the inorganic recording layer 4, it is possible to efficiently use heat and to provide a write-once optical recording medium 10 having a high recording sensitivity. Furthermore, by temporarily holding heat in the inorganic recording layer 4, and then dissipating the heat from the inside of the inorganic recording layer 4 to the third protective layer 3 having a high thermal conductivity and the reflective layer 2, a clearer mark edge can be formed to achieve a low jitter and a wide power margin. However, if the thickness of the heat storage layer is too large, and dh/(d1+dh)>0.95 (wherein d1 represents the thickness of the third protective layer, and dh represents the thickness of the heat storage layer), heat is excessively stored in the inorganic recording layer 4, and thus mark edges are not aligned and the power margin tends to be narrow. For this reason, it is preferable to satisfy dh/(d1+dh)≦0.95. For example, a sputtering method can be employed as a method for depositing the heat storage layer.

The position of the heat storage layer is not limited between the third protective layer 3 and the inorganic recording layer 4. Alternatively, for example, the heat storage layer may be provided between the inorganic recording layer 4 and the first protective layer 5. In this case, a laser beam for recording and/or reproduction is applied from the heat storage layer side to the inorganic recording layer 4. Alternatively, heat storage layers may be provided between the third protective layer 3 and the inorganic recording layer 4 and between the inorganic recording layer 4 and the first protective layer 5.

2. Second Embodiment

Figure 2:
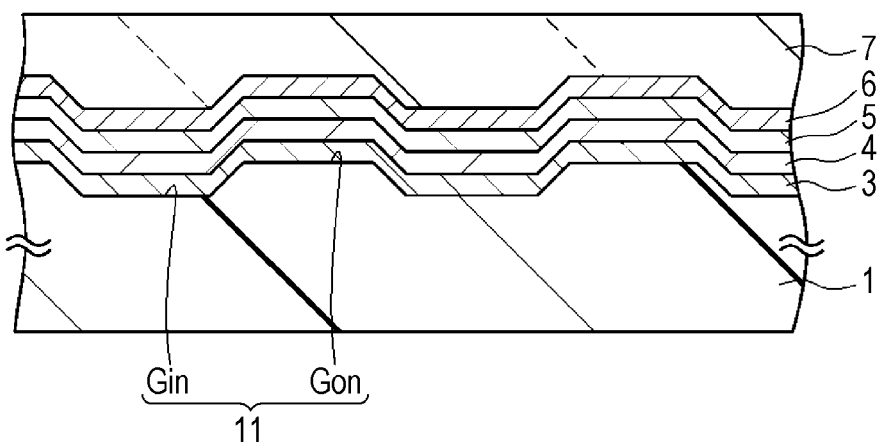
FIG. 2 is a schematic cross-sectional view illustrating a configuration example of a write-once optical recording medium according to a second embodiment of the present disclosure.

Example of Single-Layer Write-Once Optical Recording Medium that Has No Reflective Layer FIG. 2 is a schematic cross-sectional view illustrating a configuration example of a write-once optical recording medium according to a second embodiment of the present disclosure. The same components as those of the write-once optical recording medium according to the first embodiment are assigned the same reference numerals, and a description of those components is omitted. As illustrated in FIG. 2, a write-once optical recording medium 10 according to the second embodiment differs from the write-once optical recording medium 10 according to the first embodiment in that the formation of the reflective layer 2 is omitted so that a high transmittance can be obtained even at a low reflectivity. The absence of the reflective layer 2, which has a very large extinction coefficient and a large thickness, improves the transmittance for the wavelength of a laser beam for recording and/or reproduction. Accordingly, the write-once optical recording medium 10 according to the second embodiment is suitable for a case where a high transmittance is necessary. In order to achieve a higher transmittance, the inorganic recording layer 4, which generally has a large extinction coefficient, preferably has a small thickness, for example, a thickness of 7 to 14 nm. Furthermore, when it is necessary to further reduce the reflectivity, the total thickness of the first protective layer 5 and the second protective layer 6 is preferably 20 to 35 nm.

3. Third Embodiment

Example of Dual-Layer Write-Once Optical Recording Medium

Figure 3:
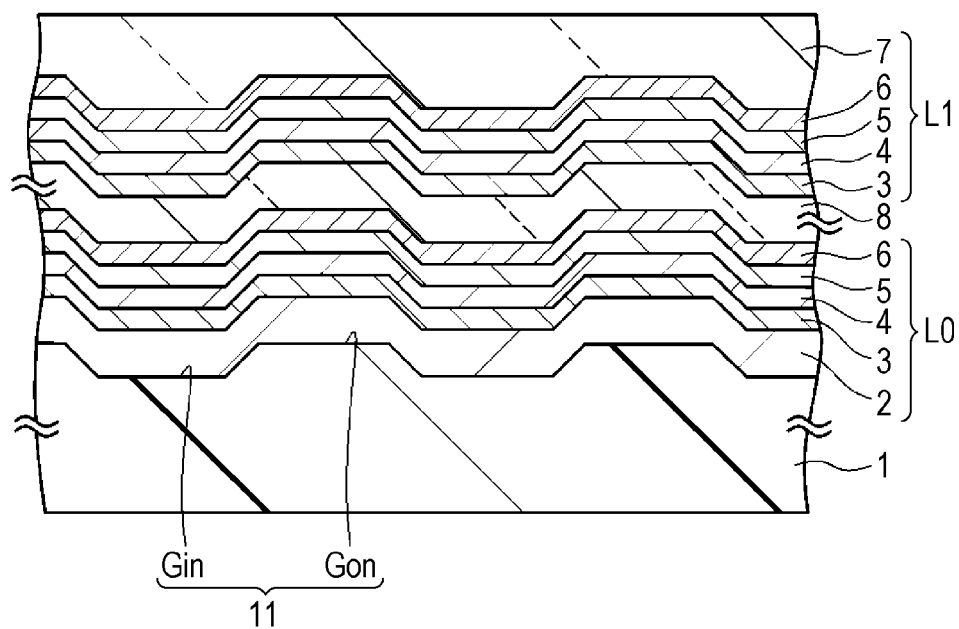
FIG. 3 is a schematic cross-sectional view illustrating a configuration example of a write-once optical recording medium according to a third embodiment of the present disclosure.

FIG. 3 is a schematic cross-sectional view illustrating a configuration example of a write-once optical recording medium according to a third embodiment of the present disclosure. The same components as those of the write-once optical recording medium according to the first embodiment are assigned the same reference numerals, and a description of those components is omitted. As illustrated in FIG. 3, a write-once optical recording medium 10 according to the third embodiment has a configuration in which a first recording layer L0, an intermediate layer 8, a second recording layer L1, and a light-transmissive layer 7 are sequentially stacked on a substrate 1.

The first recording layer L0 has the same configuration as an information signal layer of the first embodiment. Specifically, the first recording layer L0 is a stacked film in which a reflective layer 2, a third protective layer 3, an inorganic recording layer 4, a first protective layer 5, and a second protective layer 6 are stacked in that order. The second recording layer L1 has the same configuration as an information signal layer of the second embodiment. Specifically, the second recording layer L1 is a stacked film in which a third protective layer 3, an inorganic recording layer 4, a first protective layer 5, and a second protective layer 6 are stacked in that order.

As descried above, since the first recording layer L0 and the second recording layer L1 have the same configurations as those of the information signal layer of the first embodiment and the information signal layer of the second embodiment, respectively, a description of these recording layers is omitted and the intermediate layer 8 will now be described.

(Intermediate Layer)

The intermediate layer 8 has a function of separating the first recording layer L0 and the second recording layer L1 with a physically and optically sufficient distance therebetween. An uneven surface 11 is formed on the surface of the intermediate layer 8. The second recording layer L1 is deposited on this uneven surface 11. Hereinafter, a recessed portion of the uneven surface 11 is referred to as in-groove $G_{in}$, and a projecting portion of the uneven surface 11 is referred to as on-groove $G_{on}$.

Examples of the shape of the in-groove $G_{in}$ and the on-groove $G_{on}$ include various shapes such as a spiral shape and a concentric circle. The in-groove $G_{in}$ and/or the on-groove $G_{on}$ is wobbled in order to, for example, add address information.

The thickness of the intermediate layer 8 is preferably determined to be in the range of 5 to 50 µm, and particularly preferably 10 to 40 µm. The material of the intermediate layer 8 is preferably an ultraviolet-curable acrylic resin, but is not particularly limited thereto. Since the intermediate layer 8 functions as an optical path of a laser beam for recording and reproducing data on the first recording layer L0, the intermediate layer 8 preferably has a sufficiently high optical transparency.

Modification

In the first recording layer L0, a heat storage layer may be provided between the third protective layer 3 and the inorganic recording layer 4 or between the inorganic recording layer 4 and the first protective layer 5. Alternatively, heat storage layers may be provided between the third protective layer 3 and the inorganic recording layer 4 and between the inorganic recording layer 4 and the first protective layer 5. The material, the thickness, and other properties of the heat storage layer are the same as those of the first embodiment described above.

EXAMPLES

The present disclosure will now be specifically described by way of Examples, but the present disclosure is not limited to these Examples.

(Method for Analyzing Layer Composition)

In Examples, Comparative Examples, and Test Examples, the composition of each layer was determined as follows.

First, a layer (e.g., first protective layer or second protective layer) whose composition was to be determined was deposited on a flat substrate under the same deposition conditions as those of each of Examples, Comparative Examples, and Test Examples. Thus, samples were prepared. Next, the layer composition of each of the samples was examined inductively coupled plasma (ICP) mass spectrometry with an ICP mass spectrometer.

(Determination of Average Thickness)

In Examples, Comparative Examples, and Test Examples, the average thickness of each layer was determined as follows.

First, a layer whose thickness was to be determined was deposited on a flat substrate under the same deposition conditions as those of each of Examples, Comparative Examples, and Test Examples. Thus, samples were prepared. Next, each of the samples was cut by focused ion beam (FIB) in a direction perpendicular to a main surface of the substrate to form a cross section. Next, the thickness of the layer was measured from the cross section with a transmission electron microscope (TEM). This measurement was repeatedly performed for ten samples. The measured values were simply averaged (arithmetically averaged) to determine the average thickness.

Examples, Comparative Examples, and Test Examples will now be described.

1. Examination of Compositions of First Protective Layer and Third Protective Layer

Test Example 1

First, a polycarbonate substrate having a thickness of 1.1 mm was formed by injection molding. An uneven surface having in-grooves $G_{in}$ and on-grooves $G_{on}$ was formed on the polycarbonate substrate.

Next, a reflective layer, a third protective layer, a heat storage layer, an inorganic recording layer, and a first protective layer were sequentially stacked on the polycarbonate substrate by a sputtering method. The specific configurations of these layers were as follows.

Reflective layer: Ag alloy, 80 nm (average thickness)
Third protective layer: $In_2O_3$, 14 nm (average thickness)
Heat storage layer: ZnS—$SiO_2$, 7 nm
Inorganic recording layer: $[(ZnS)_{80}(SiO_2)_{20}]_{40}Sb_{60}$, 18 nm (average thickness)
First protective layer: $In_2O_3$, 17 nm (average thickness)

Next, an ultraviolet-curable resin was uniformly applied onto the first protective layer by a spin-coating method, and this ultraviolet-curable resin was cured by being irradiated with ultraviolet light, thereby forming a light-transmissive layer having a thickness of 0.1 mm. Thus, a write-once optical recording medium was prepared.

Test Example 2

A write-once optical recording medium was prepared as in Test Example 1 except that the first protective layer and the third protective layer were each formed of $(In_2O_3)_{90}(Ga_2O_3)_{10}$. The first protective layer and the third protective layer were formed by a co-sputtering method using two types of targets made of $In_2O_3$ and $Ga_2O_3$ as the materials of these protective layers.

Test Example 3

A write-once optical recording medium was prepared as in Test Example 2 except that the first protective layer and the third protective layer were each formed of $(In_2O_3)_{80}(Ga_2O_3)_{20}$.

Test Example 4

A write-once optical recording medium was prepared as in Test Example 2 except that the first protective layer and the third protective layer were each formed of $(In_2O_3)_{60}(Ga_2O_3)_{40}$.

Test Example 5

A write-once optical recording medium was prepared as in Test Example 2 except that the first protective layer and the third protective layer were each formed of $(In_2O_3)_{35}(Ga_2O_3)_{65}$.

Test Example 6

A write-once optical recording medium was prepared as in Test Example 2 except that the first protective layer and the third protective layer were each formed of $(In_2O_3)_{20}(Ga_2O_3)_{80}$.

Test Example 7

A write-once optical recording medium was prepared as in Test Example 1.

Test Example 8

A write-once optical recording medium was prepared as in Test Example 1 except that the first protective layer and the third protective layer were each formed of $(In_2O_3)_{90}(CeO_2)_{10}$. The first protective layer and the third protective layer were formed by a co-sputtering method using two types of targets made of $In_2O_3$ and $CeO_2$ as the materials of these protective layers.

Test Example 9

A write-once optical recording medium was prepared as in Test Example 8 except that the first protective layer and the third protective layer were each formed of $(In_2O_3)_{85}(CeO_2)_{15}$.

Test Example 10

A write-once optical recording medium was prepared as in Test Example 8 except that the first protective layer and the third protective layer were each formed of $(In_2O_3)_{60}(CeO_2)_{40}$.

Test Example 11

A write-once optical recording medium was prepared as in Test Example 8 except that the first protective layer and the third protective layer were each formed of $(In_2O_3)_{40}(CeO_2)_{60}$.

Test Example 12

A write-once optical recording medium was prepared as in Test Example 8 except that the first protective layer and the third protective layer were each formed of $(In_2O_3)_{20}(CeO_2)_{80}$.

Test Example 13

A write-once optical recording medium was prepared as in Test Example 1.

Test Example 14

A write-once optical recording medium was prepared as in Test Example 1 except that the first protective layer and the third protective layer were each formed of $(In_2O_3)_{90}(Sn_2O_3)_{10}$. The first protective layer and the third protective layer were formed by a co-sputtering method using two types of targets made of $In_2O_3$ and $Sn_2O_3$ as the materials of these protective layers.

Test Example 15

A write-once optical recording medium was prepared as in Test Example 14 except that the first protective layer and the third protective layer were each formed of $(In_2O_3)_{80}(Sn_2O_3)_{20}$.

Test Example 16

A write-once optical recording medium was prepared as in Test Example 14 except that the first protective layer and the third protective layer were each formed of $(In_2O_3)_{60}(Sn_2O_3)_{40}$.

Test Example 17

A write-once optical recording medium was prepared as in Test Example 14 except that the first protective layer and the third protective layer were each formed of $(In_2O_3)_{40}(Sn_2O_3)_{60}$.

Test Example 18

A write-once optical recording medium was prepared as in Test Example 14 except that the first protective layer and the third protective layer were each formed of $(In_2O_3)_{20}(Sn_2O_3)_{80}$.

(Evaluation of Signal Characteristics)

Signal characteristics of the write-once optical recording media prepared as described above were evaluated as follows using ODU-1000 manufactured by Pulstec Industrial Co., Ltd. as an evaluation device.

In this evaluation device, the wavelength of a laser beam was set to 405 nm and the numerical aperture NA was set to 0.85. Recording was performed on each of the write-once optical recording media at a linear velocity of 19.68 m/s, which is 4-times speed, in accordance with the standard of Blu-ray Disc 25 GB density, and reproduction was performed at 4.92 m/s, which is 1-time speed. The jitter was measured through an equalizer board manufactured by Pulstec Industrial Co., Ltd. using a time interval analyzer TA720 manufactured by Yokogawa Electric Corporation. Thus, a signal evaluation was performed. The results are shown in Table 1 and FIG. 4.

The jitter is preferably in the range of 7.5% or less, and more preferably 7.0% or less. This is because it is well known that there is a correlation between a jitter of 7.5% or less and a sufficiently low error rate.

(Evaluation of Storage Reliability)

Storage reliability of the signal characteristics of the write-once optical recording media prepared as described above was evaluated as follows.

The write-once optical recording media on which information signals had been recorded were stored in an environment at 80° C. and 85% RH for 600 hours, and a symbol error rate (SER) was then observed. A Blu-ray Disc drive (BDR-101A) manufactured by Pioneer Corporation was used for a recording/reproduction evaluation of the information signals. The results are shown in Table 1 and FIG. 5.

The SER is preferably $2.0 \times 10^{-3}$ or less, more preferably $1.0 \times 10^{-3}$ or less, and still more preferably $3.0 \times 10^{-4}$ or less. This is because sufficient storage reliability in practical use can be generally obtained by achieving an SER of $2 \times 10^{-3}$ or less at which the error rate does not fall after the storage test.

Table 1 shows the jitter characteristics and storage reliability of the write-once optical recording media of Test Examples 1 to 18.

TABLE 1

| | First protective layer/Third protective layer | α (mol %) | Jitter | SER |
|---|---|---|---|---|
| Test Example 1 | $In_2O_3$ | 0 | 6.3 | $3.0 \times 10^{-3}$ |
| Test Example 2 | $(In_2O_3)_{90}(Ga_2O_3)_{10}$ | 10 | 5.7 | $1.5 \times 10^{-4}$ |
| Test Example 3 | $(In_2O_3)_{80}(Ga_2O_3)_{20}$ | 20 | 5.4 | $8.0 \times 10^{-5}$ |
| Test Example 4 | $(In_2O_3)_{60}(Ga_2O_3)_{40}$ | 40 | 6.2 | $2.2 \times 10^{-4}$ |
| Test Example 5 | $(In_2O_3)_{35}(Ga_2O_3)_{65}$ | 65 | 6.9 | $8.0 \times 10^{-4}$ |
| Test Example 6 | $(In_2O_3)_{20}(Ga_2O_3)_{80}$ | 80 | 7.8 | $3.0 \times 10^{-3}$ |
| Test Example 7 | $In_2O_3$ | 0 | 6.3 | $3.0 \times 10^{-3}$ |
| Test Example 8 | $(In_2O_3)_{90}(CeO_2)_{10}$ | 10 | 5.8 | $2.4 \times 10^{-4}$ |
| Test Example 9 | $(In_2O_3)_{85}(CeO_2)_{15}$ | 15 | 5.5 | $8.2 \times 10^{-5}$ |
| Test Example 10 | $(In_2O_3)_{60}(CeO_2)_{40}$ | 40 | 5.9 | $1.7 \times 10^{-4}$ |
| Test Example 11 | $(In_2O_3)_{40}(CeO_2)_{60}$ | 60 | 6.6 | $5.7 \times 10^{-4}$ |
| Test Example 12 | $(In_2O_3)_{20}(CeO_2)_{80}$ | 80 | 7.4 | $1.5 \times 10^{-3}$ |
| Test Example 13 | $In_2O_3$ | 0 | 6.1 | $2.5 \times 10^{-3}$ |
| Test Example 14 | $(In_2O_3)_{90}(Sn_2O_3)_{10}$ | 10 | 5.6 | $2.0 \times 10^{-4}$ |
| Test Example 15 | $(In_2O_3)_{80}(Sn_2O_3)_{20}$ | 20 | 5.4 | $9.0 \times 10^{-5}$ |
| Test Example 16 | $(In_2O_3)_{60}(Sn_2O_3)_{40}$ | 40 | 5.8 | $2.8 \times 10^{-4}$ |
| Test Example 17 | $(In_2O_3)_{40}(Sn_2O_3)_{60}$ | 60 | 6.5 | $6.0 \times 10^{-4}$ |
| Test Example 18 | $(In_2O_3)_{20}(Sn_2O_3)_{80}$ | 80 | 7.2 | $1.2 \times 10^{-3}$ |

α: Proportion of $(Ga_2O_3)$, $(CeO_2)$, or $(Sn_2O_3)$

Figure 4:
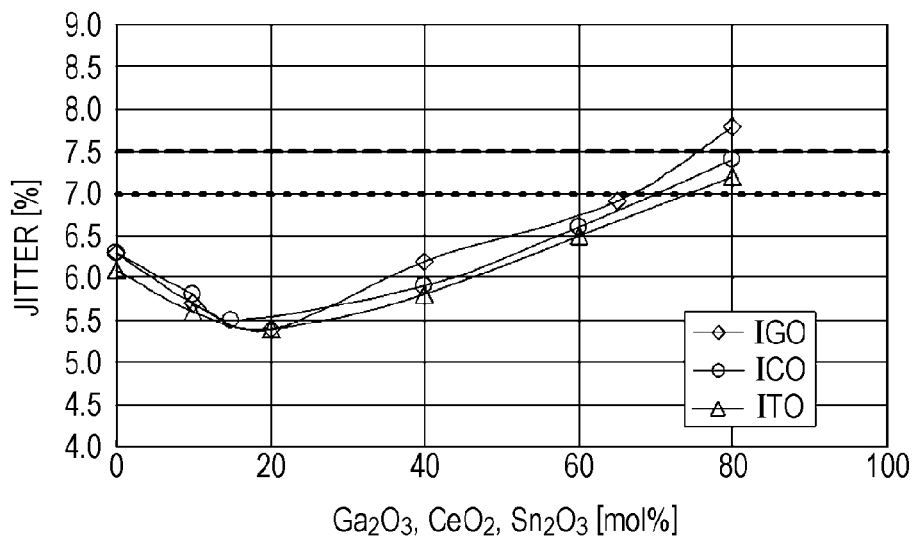
FIG. 4 is a graph showing jitter characteristics of write-once optical recording media of Test Examples 1 to 18.
Figure 5:
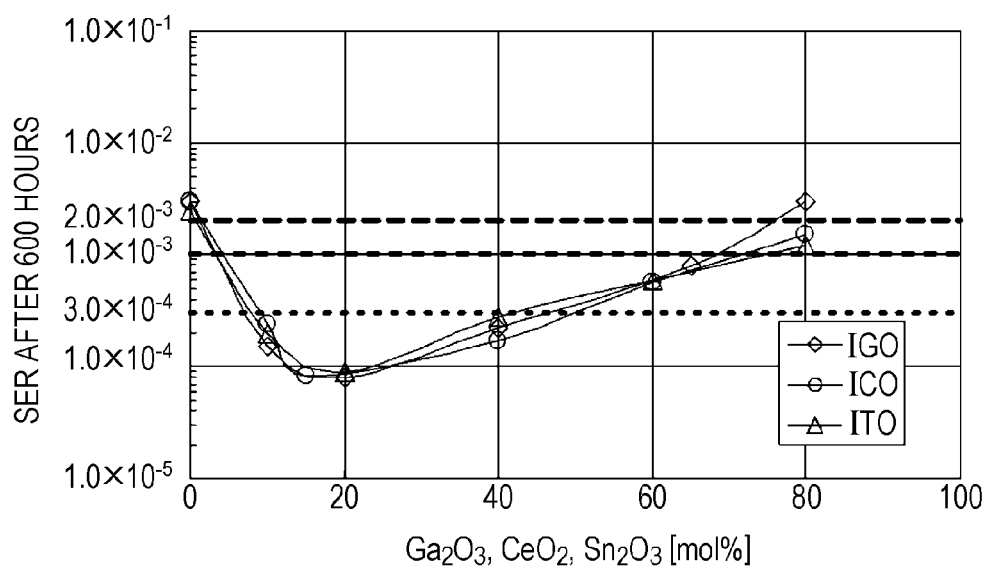
FIG. 5 is a graph showing storage reliability of the write-once optical recording media of Test Examples 1 to 18.

FIG. 4 is a graph showing jitter characteristics of the write-once optical recording media of Test Examples 1 to 18. FIG. 5 is a graph showing storage reliability of the write-once optical recording media of Test Examples 1 to 18. In FIGS. 4 and 5, $(In_2O_3)_x(Ga_2O_3)_y$ materials are represented by IGO, $(In_2O_3)_x(CeO_2)_y$ materials are represented by ICO, and $(In_2O_3)_x(Sn_2O_3)_y$ materials are represented by ITO.

The above evaluation results show the following.

The information signal characteristics and the storage reliability changed depending on the amount of $Ga_2O_3$, $CeO_2$, or $Sn_2O_3$ added.

In order to satisfy characteristics of an SER of $2.0 \times 10^{-3}$ or less, the amount of $Ga_2O_3$, $CeO_2$, or $Sn_2O_3$ added is preferably in the range of 5% to 75% by mole. In order to satisfy characteristics of a jitter of 7.5% or less and an SER of $2.0 \times 10^{-3}$ or less, the amount of $Ga_2O_3$, $CeO_2$, or $Sn_2O_3$ added is preferably in the range of 5% to 75% by mole. Note that a jitter of 7.5% and an SER of $2.0 \times 10^{-3}$ are preferable upper limits in terms of characteristics of optical recording media, as described above.

In order to satisfy characteristics of an SER of $1.0 \times 10^{-3}$ or less, the amount of $Ga_2O_3$, $CeO_2$, or $Sn_2O_3$ added is preferably in the range of 5% to 65% by mole. In order to satisfy characteristics of a jitter of 7.0% or less and an SER of $1.0 \times 10^{-3}$ or less, the amount of $Ga_2O_3$, $CeO_2$, or $Sn_2O_3$ added is preferably in the range of 5% to 65% by mole.

In order to satisfy characteristics of an SER of $3.0 \times 10^{-4}$ or less, the amount of $Ga_2O_3$, $CeO_2$, or $Sn_2O_3$ added is preferably in the range of 10% to 40% by mole. In order to satisfy characteristics of a jitter of 7.0% or less and an SER of $3.0 \times 10^{-4}$ or less, the amount of $Ga_2O_3$, $CeO_2$, or $Sn_2O_3$ added is preferably in the range of 10% to 40% by mole.

The reason why the storage reliability was degraded when the amount of $Ga_2O_3$, $CeO_2$, or $Sn_2O_3$ added was less than 5% by mole is believed that the amount of $In_2O_3$ component was too large, and thus oxygen and moisture entered from grain boundaries of an $In_2O_3$ film to the recording film. On the other hand, the reason why satisfactory information signal characteristics were difficult to be obtained when the amount of $Ga_2O_3$, $CeO_2$, or $Sn_2O_3$ added exceeded 75% by mole is believed that characteristics of the added material were increased in the protective film, and thus satisfactory information signal characteristics obtained from $In_2O_3$ were difficult to be obtained.

According to the above results, the content of tin oxide, cerium oxide, or gallium oxide in the first protective layer and the third protective layer is preferably in the range of 5% to 75% by mole, more preferably 5% to 65% by mole, and still more preferably 100 to 40% by mole from the standpoint of an improvement of storage reliability or an improvement of information signal characteristics and storage reliability. This is represented by the following composition formula:

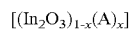

wherein A represents tin oxide, cerium oxide, or gallium oxide, and X preferably satisfies $0.05 \leq X \leq 0.75$, more preferably $0.05 \leq X \leq 0.65$, and still more preferably $0.10 \leq X \leq 0.40$.

2. Examination of Material of Second Protective Layer

Example 1

First, a polycarbonate substrate having a thickness of 1.1 mm was formed by injection molding. An uneven surface having grooves was formed on the polycarbonate substrate. Next, a third protective layer, an inorganic recording layer, a first protective layer, and a second protective layer were sequentially stacked on the polycarbonate substrate by a sputtering method. The specific configurations of the layers were as follows.

Third protective layer: ITO, 8 nm (average thickness)
Inorganic recording layer: $[(ZnS)_{80}(SiO_2)_{20}]_{40}Sb_{60}$, 11 nm (average thickness)
First protective layer: ITO, 19 nm (average thickness)
Second protective layer: $TiO_2$, 10 nm (average thickness)

Each of the layers was formed using a target having a diameter of 200 mm. The ITO layers serving as the first protective layer and the third protective layer were deposited by DC sputtering of an ITO target in an atmosphere containing Ar and $O_2$. The $[(ZnS)_{80}(SiO_2)_{20}]_{40}Sb_{60}$ layer serving as the inorganic recording layer was deposited by RF sputtering of a $[(ZnS)_{80}(SiO_2)_{20}]_{40}Sb_{60}$ target in an Ar atmosphere. The $TiO_2$ layer serving as the second protective layer was deposited by DC sputtering of a $TiO_2$ target in an atmosphere containing Ar and $O_2$.

Next, an ultraviolet-curable resin was uniformly applied onto the second protective layer by a spin-coating method, and this ultraviolet-curable resin was cured by being irradiated with ultraviolet light, thereby forming a light-transmissive layer having a thickness of 0.1 mm. Thus, a write-once optical recording medium was prepared.

Example 2

A write-once optical recording medium was prepared as in Example 1 except that the second protective layer was formed of a compound oxide of zirconium oxide, indium oxide, and silicon oxide (SIZ).

Example 3

A write-once optical recording medium was prepared as in Example 1 except that the second protective layer was formed of a compound oxide of tin oxide and tantalum oxide (TTO).

Example 4

A write-once optical recording medium was prepared as in Example 1 except that the first protective layer was formed of a compound oxide of indium oxide and cerium oxide (ICO).

Example 5

A write-once optical recording medium was prepared as in Example 1 except that the first protective layer was formed of a compound oxide of indium oxide and gallium oxide (IGO).

Comparative Example 1

A write-once optical recording medium was prepared as in Example 1 except that the formation of the second protective layer was omitted.

Comparative Example 2

A write-once optical recording medium was prepared as in Example 1 except that the second protective layer was formed of silicon nitride (SiN).

Comparative Example 3

A write-once optical recording medium was prepared as in Example 1 except that the second protective layer was formed of a compound oxide of chromium oxide, indium oxide, and zinc oxide (hereinafter referred to as "CIZ").

Comparative Example 4

A write-once optical recording medium was prepared as in Example 1 except that the second protective layer was formed of a compound oxide of aluminum oxide and zinc oxide (hereinafter referred to as "AZO").

Comparative Example 5

A write-once optical recording medium was prepared as in Example 1 except that the first protective layer was formed of silicon nitride (SiN).

Comparative Example 6

A write-once optical recording medium was prepared as in Example 1 except that the first protective layer was formed of aluminum oxide ($Al_2O_3$).
(Evaluation of Storage Reliability)

Storage reliability of the write-once optical recording media prepared as described above was evaluated as follows by using ODU-1000 manufactured by Pulstec Industrial Co., Ltd. as an evaluation device.

First, in this evaluation device, the wavelength of a laser beam was set to 405 nm and the numerical aperture NA was set to 0.85. Recording was performed on each of the write-once optical recording media at a linear velocity of 9.84 m/s, which is 2-times speed, in accordance with the standard of Blu-ray Disc 25 GB density, and reproduction was performed at 4.92 m/s, which is 1-time speed. Thus, an error rate (hereinafter referred to as "initial error rate") was evaluated. Next, each of the write-once optical recording media was stored in an environment at 80° C. and 85% RH for 400 hours, and an error rate (hereinafter referred to as "error rate after storage") was evaluated. Next, an error rate ratio ((error rate after storage)/((initial error rate)) before and after the storage test was calculated, and used as an evaluation tool. The results are shown in Table 2.

After the storage test, the error rate is preferably $2.0 \times 10^{-3}$ or less, more preferably $1.0 \times 10^{-3}$ or less, and still more preferably $3.0 \times 10^{-4}$ or less. This is because sufficient storage reliability in practical use can be generally obtained by achieving an error rate of $2 \times 10^{-3}$ or less at which the error rate does not fall after the storage test.

In order to obtain desired characteristics of a product, the error rate ratio before and after the storage test is preferably in the range of 1.80 or less, more preferably 1.30 or less, and still more preferably 1.10 or less. In this evaluation, in order to determine storage reliability higher than the error rate after the storage test ($2 \times 10^{-3}$ or less), the error rate ratio before and after the storage test was further used as an evaluation tool, and the error rate ratio was set to be 1.30 or less in consideration of a measurement error.

Table 2 shows the evaluation results of storage reliability of the write-once optical recording media of Examples 1 to 5 and Comparative Examples 1 to 6.

TABLE 2

| | First protective layer | Second protective layer | Error rate (Initial) | Error rate (After storage) | Error rate ratio |
|---|---|---|---|---|---|
| Example 1 | ITO | $TiO_2$ | $4.04 \times 10^{-5}$ | $4.31 \times 10^{-5}$ | 1.07 |
| Example 2 | ITO | SIZ | $7.18 \times 10^{-5}$ | $7.86 \times 10^{-5}$ | 1.09 |
| Example 3 | ITO | TTO | $8.35 \times 10^{-5}$ | $8.38 \times 10^{-5}$ | 1.00 |
| Example 4 | ICO | $TiO_2$ | $5.13 \times 10^{-5}$ | $5.34 \times 10^{-5}$ | 1.04 |
| Example 5 | IGO | $TiO_2$ | $4.78 \times 10^{-5}$ | $5.02 \times 10^{-5}$ | 1.05 |
| Comparative Example 1 | ITO | Nor formed | $9.18 \times 10^{-5}$ | $1.66 \times 10^{-4}$ | 1.81 |
| Comparative Example 2 | ITO | SiN | $2.00 \times 10^{-4}$ | $2.68 \times 10^{-4}$ | 1.34 |
| Comparative Example 3 | ITO | CIZ | $8.31 \times 10^{-5}$ | Could not be measured | — |
| Comparative Example 4 | ITO | AZO | $4.11 \times 10^{-5}$ | Could not be measured | — |
| Comparative Example 5 | SiN | $TiO_2$ | $1.03 \times 10^{-4}$ | $1.12 \times 10^{-3}$ | 10.87 |
| Comparative Example 6 | $Al_2O_3$ | $TiO_2$ | $1.11 \times 10^{-4}$ | $9.40 \times 10^{-4}$ | 8.47 |

Table 2 shows the following.

Although the initial error rate was satisfactory regardless of the types of materials of the first protective layer and the second protective layer, the error rate after the storage test significantly varied depending on the types of materials of the first protective layer and the second protective layer. Specifically, in Comparative Example 1, in which the second protective layer was not formed and the first protective layer was composed of ITO, and Comparative Examples 2 to 4, in which the second protective layer was composed of SiN, CIZ, and AZO, respectively, the error rate was significantly degraded after the storage test. In contrast, in Examples 1 to 3, in which the first protective layer was composed of ITO, and the second protective layer was composed of $TiO_2$, SIZ, and TTO, respectively, an increase in the error rate after the storage test was markedly suppressed. In Comparative Examples 5 and 6, in which the second protective layer was composed of $TiO_2$, and the first protective layer was composed of SiN and $Al_2O_3$, respectively, the error rate was significantly degraded after the storage test. In contrast, in Example 1 and Examples 4 and 5, in which the second protective layer was composed of $TiO_2$, and the first protective layer was composed of ITO, ICO, and IGO, respectively, an increase in the error rate after the storage test was markedly suppressed.

Accordingly, when ITO, IGO, or ICO was used as the first protective layer, high storage reliability can be obtained in terms of practical use. Furthermore, when $TiO_2$, SIZ, or TTO was used as the second protective layer adjacent to the first protective layer, higher storage reliability can be obtained. As for SIZ, which was used as the second protective layer of Example 2, it is generally believed that a thin film composed of SIZ is amorphous and has few grain boundaries. Thus, it is believed that since an SIZ thin film has few grain boundaries, oxygen and moisture do not tend to enter from the outside. Similarly, $TiO_2$ and TTO, which were effective in good storage reliability, are also believed to have a property that thin films made of these materials have few grain boundaries. In contrast, in Comparative Examples 3 and 4, in which CIZ and AZO each containing zinc oxide were used, respectively, the error rate was significantly degraded after the storage test. The reason for this is believed to be as follows. Since grain boundaries are very easily formed in zinc oxide, intrusion of oxygen and moisture from the grain boundaries significantly occurs, resulting in the significant degradation of the storage reliability.

According to the above results, high storage reliability can be achieved by forming a first protective layer containing indium oxide on at least one surface of the inorganic recording layer, and forming a second protective layer containing titanium oxide, zirconium oxide, or tin oxide so as to be adjacent to the first protective layer.

3. Examination of Average Thickness of Second Protective Layer

Example 6

A write-once optical recording medium was prepared as in Example 1 except that the average thickness of the second protective layer was changed to 2 nm.

Example 7

A write-once optical recording medium was prepared as in Example 1 except that the average thickness of the second protective layer was changed to 4 nm.

Example 8

A write-once optical recording medium was prepared as in Example 1 except that the average thickness of the second protective layer was changed to 7 nm.

Example 9

A write-once optical recording medium was prepared as in Example 1 so that the average thickness of the second protective layer was 10 nm.

Example 10

A write-once optical recording medium was prepared as in Example 1 except that the average thickness of the second protective layer was changed to 15 nm.

Comparative Example 7

A write-once optical recording medium was prepared as in Example 1 except that the average thickness of the second protective layer was changed to 0 nm.

(Evaluation of Storage Reliability)

Storage reliability of the write-once optical recording media prepared as described above was evaluated as in Examples 1 to 5 and Comparative Examples 1 to 6. The results are shown in Table 3 and FIG. 6.

Figure 6:
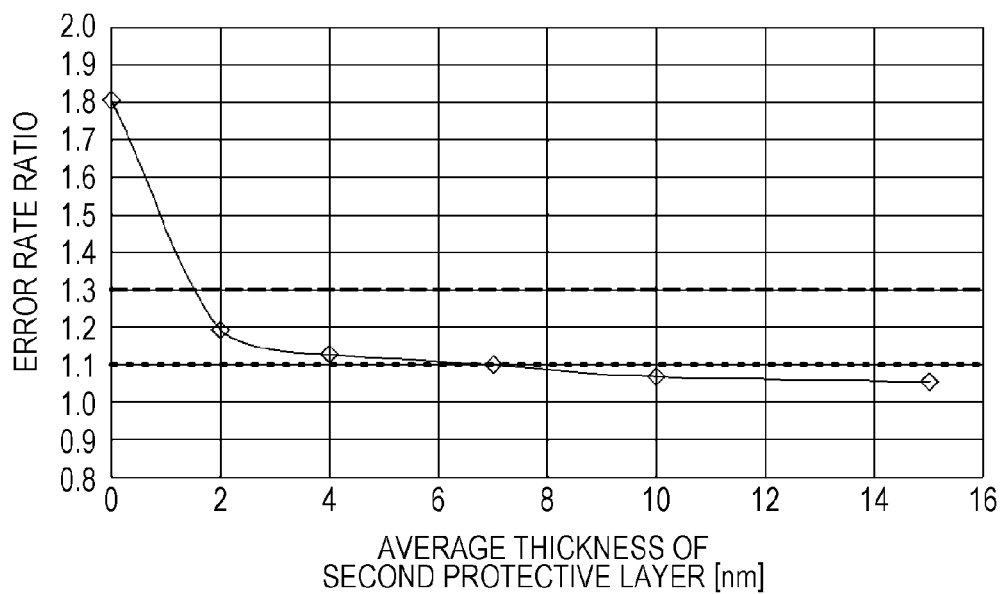
FIG. 6 is a graph showing storage reliability of write-once optical recording media of Examples 6 to 10 and Comparative Example 7.

FIG. 6 is a graph showing the storage reliability of the write-once optical recording media of Examples 6 to 10 and Comparative Example 7.

Table 3 shows the evaluation results of error rates before and after a storage test and the ratio of the error rate after the storage test to the initial error rate of the write-once optical recording media of Examples 6 to 10 and Comparative Example 7.

TABLE 3

| | Average thickness of second protective layer (nm) | Error rate (Initial) | Error rate (After storage) | Error rate ratio |
|---|---|---|---|---|
| Example 6 | 2 | $5.45 \times 10^{-5}$ | $6.49 \times 10^{-5}$ | 1.19 |
| Example 7 | 4 | $4.21 \times 10^{-5}$ | $4.74 \times 10^{-5}$ | 1.13 |
| Example 8 | 7 | $4.06 \times 10^{-5}$ | $4.47 \times 10^{-5}$ | 1.10 |
| Example 9 | 10 | $4.04 \times 10^{-5}$ | $4.31 \times 10^{-5}$ | 1.07 |
| Example 10 | 15 | $4.08 \times 10^{-5}$ | $4.30 \times 10^{-5}$ | 1.05 |
| Comparative Example 7 | 0 | $9.18 \times 10^{-5}$ | $1.66 \times 10^{-4}$ | 1.81 |

Table 3 and FIG. 6 show the following.

With an increase in the average thickness of the second protective layer, the error rate ratio tended to decrease, that is, the storage reliability tended to improve. From the standpoint of storage reliability, the second protective layer preferably has a large thickness. More specifically, when the average thickness of the second protective layer is 2 nm or more, the error rate ratio can be reduced to 1.30 or less. When the average thickness of the second protective layer is 7 nm or more, the error rate ratio can be reduced to 1.10 or less.

On the other hand, from the standpoint of productivity, the second protective layer preferably has a small average thickness because the sputtering rates of $TiO_2$, SIZ, and TTO, which are preferable materials of the second protective layer from the standpoint of storage reliability, are lower than those of ITO, ICO, and IGO, which are preferable materials of the first protective layer.

In view of this trade-off between storage reliability and productivity, the average thickness of the second protective layer is preferably in the range of 2 to 10 nm, and more preferably 7 to 10 nm.

4. Examination of Composition of Second Protective Layer 4-1 Examination of Composition $(TiO_2)_x(SiO_2)_y$ of Second Protective Layer

Example 11

A write-once optical recording medium was prepared as in Example 1 except that the second protective layer was formed of $(TiO_2)_{30}(SiO_2)_{70}$.

Example 12

A write-once optical recording medium was prepared as in Example 1 except that the second protective layer was formed of $(TiO_2)_{50}(SiO_2)_{50}$.

Example 13

A write-once optical recording medium was prepared as in Example 1 except that the second protective layer was formed of $(TiO_2)_{70}(SiO_2)_{30}$.

Example 14

A write-once optical recording medium including a second protective layer composed of $TiO_2$ was prepared as in Example 1.

Comparative Example 8

A write-once optical recording medium was prepared as in Example 1 except that the second protective layer was formed of $SiO_2$.

(Evaluation of Storage Reliability)

Storage reliability of the write-once optical recording media prepared as described above was evaluated as in Examples 1 to 5 and Comparative Examples 1 to 6. The results are shown in Table 4 and FIG. 7.

Figure 7:
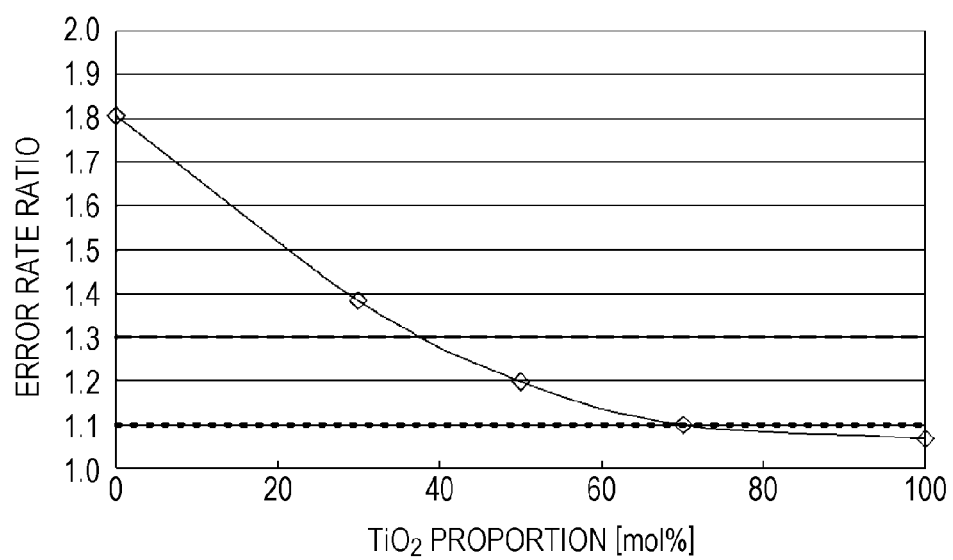
FIG. 7 is a graph showing storage reliability of write-once optical recording media of Examples 11 to 14 and Comparative Example 8.

FIG. 7 is a graph showing the storage reliability of the write-once optical recording media of Examples 11 to 14 and Comparative Example 8.

Table 4 shows the evaluation results of error rates before and after a storage test and the ratio of the error rate after the storage test to the initial error rate of the write-once optical recording media of Examples 11 to 14 and Comparative Example 8. Table 4 also shows the evaluation results of Comparative Example 1 including a single protective layer containing ITO in order to compare these evaluation results with the evaluation results of Examples 11 to 14 and Comparative Example 8.

TABLE 4

|  | $TiO_2$ proportion [mol %] | $SiO_2$ proportion [mol %] | Error rate (Initial) | Error rate (After storage) | Error rate ratio |
|---|---|---|---|---|---|
| Example 11 | 30 | 70 | $6.80 \times 10^{-5}$ | $0.94 \times 10^{-4}$ | 1.38 |
| Example 12 | 50 | 50 | $5.24 \times 10^{-5}$ | $6.28 \times 10^{-5}$ | 1.20 |
| Example 13 | 70 | 30 | $4.27 \times 10^{-5}$ | $0.47 \times 10^{-4}$ | 1.10 |
| Example 14 | 100 | 0 | $4.04 \times 10^{-5}$ | $4.31 \times 10^{-5}$ | 1.07 |
| Comparative Example 8 | 0 | 100 | $9.18 \times 10^{-5}$ | $1.66 \times 10^{-4}$ | 1.81 |
| Comparative Example 1 | — | — | $9.18 \times 10^{-5}$ | $1.66 \times 10^{-4}$ | 1.81 |

Table 4 and FIG. 7 show the following.

The error rate ratio could be reduced by incorporating titanium oxide in the second protective layer. Furthermore, the error rate ratio tended to decrease with an increase in the content of titanium oxide in the second protective layer.

When the content of titanium oxide was 40% by mole or more, the error rate ratio could be reduced to 1.30 or less. When the content of titanium oxide was further increased to 70% by mole or more, the error rate ratio could be reduced to 1.10 or less.

According to the above results, from the standpoint of improving storage reliability, it is preferable to incorporate titanium oxide in the second protective layer. The content of titanium oxide is preferably 40% by mole or more and 100% by mole or less, and more preferably 70% by mole or more and 100% by mole or less.

4-2 Examination of Composition $(SiO_2)_x(In_2O_3)_y(ZrO_2)_z$ of Second Protective Layer Example 15

A write-once optical recording medium was prepared as in Example 1 except that the second protective layer was formed of $(SiO_2)_{60}(In_2O_3)_{20}(ZrO_2)_{20}$.

Example 16

A write-once optical recording medium was prepared as in Example 1 except that the second protective layer was formed of $(SiO_2)_{10}(In_2O_3)_{70}(ZrO_2)_{20}$.

Example 17

A write-once optical recording medium was prepared as in Example 1 except that the second protective layer was formed of $(SiO_2)_{10}(In_2O_3)_{20}(ZrO_2)_{70}$.

Example 18

A write-once optical recording medium was prepared as in Example 1 except that the second protective layer was formed of $(SiO_2)_{50}(In_2O_3)_{30}(ZrO_2)_{20}$.

Example 19

A write-once optical recording medium was prepared as in Example 1 except that the second protective layer was formed of $(SiO_2)_{20}(In_2O_3)_{60}(ZrO_2)_{20}$.

Example 20

A write-once optical recording medium was prepared as in Example 1 except that the second protective layer was formed of $(SiO_2)_{20}(In_2O_3)_{30}(ZrO_2)_{50}$.

Example 21

A write-once optical recording medium was prepared as in Example 1 except that the second protective layer was formed of $(SiO_2)_{35}(In_2O_3)_{30}(ZrO_2)_{35}$.

Example 22

A write-once optical recording medium was prepared as in Example 1 except that the second protective layer was formed of $(SiO_2)_{25}(In_2O_3)_{50}(ZrO_2)_{25}$.

Example 23

A write-once optical recording medium was prepared as in Example 1 except that the second protective layer was formed of $(SiO_2)_{30}(In_2O_3)_{20}(ZrO_2)_{50}$.

Example 24

A write-once optical recording medium was prepared as in Example 1 except that the second protective layer was formed of $(SiO_2)_{10}(In_2O_3)_{50}(ZrO_2)_{40}$.

Example 25

A write-once optical recording medium was prepared as in Example 1 except that the second protective layer was formed of $(SiO_2)_{80}(In_2O_3)_{10}(ZrO_2)_{10}$.

Example 26

A write-once optical recording medium was prepared as in Example 1 except that the second protective layer was formed of $(SiO_2)_{40}(In_2O_3)_{50}(ZrO_2)_{10}$.

Example 27

A write-once optical recording medium was prepared as in Example 1 except that the second protective layer was formed of $(SiO_2)_{10}(In_2O_3)_{80}(Zro_2)_{10}$.

Example 28

A write-once optical recording medium was prepared as in Example 1 except that the second protective layer was formed of $(In_2O_3)_{50}(ZrO_2)_{50}$.

Example 29

A write-once optical recording medium was prepared as in Example 1 except that the second protective layer was formed of $(SiO_2)_{10}(In_2O_3)_{10}(ZrO_2)_{50}$.

Example 30

A write-once optical recording medium was prepared as in Example 1 except that the second protective layer was formed of $(SiO_2)_{40}(In_2O_3)_{10}(ZrO_2)_{50}$.

(Evaluation of Storage Reliability)

Storage reliability of the write-once optical recording media prepared as described above was evaluated as in Examples 1 to 5 and Comparative Examples 1 to 6. The results are shown in Table 5 and FIG. 8.

Figure 8:
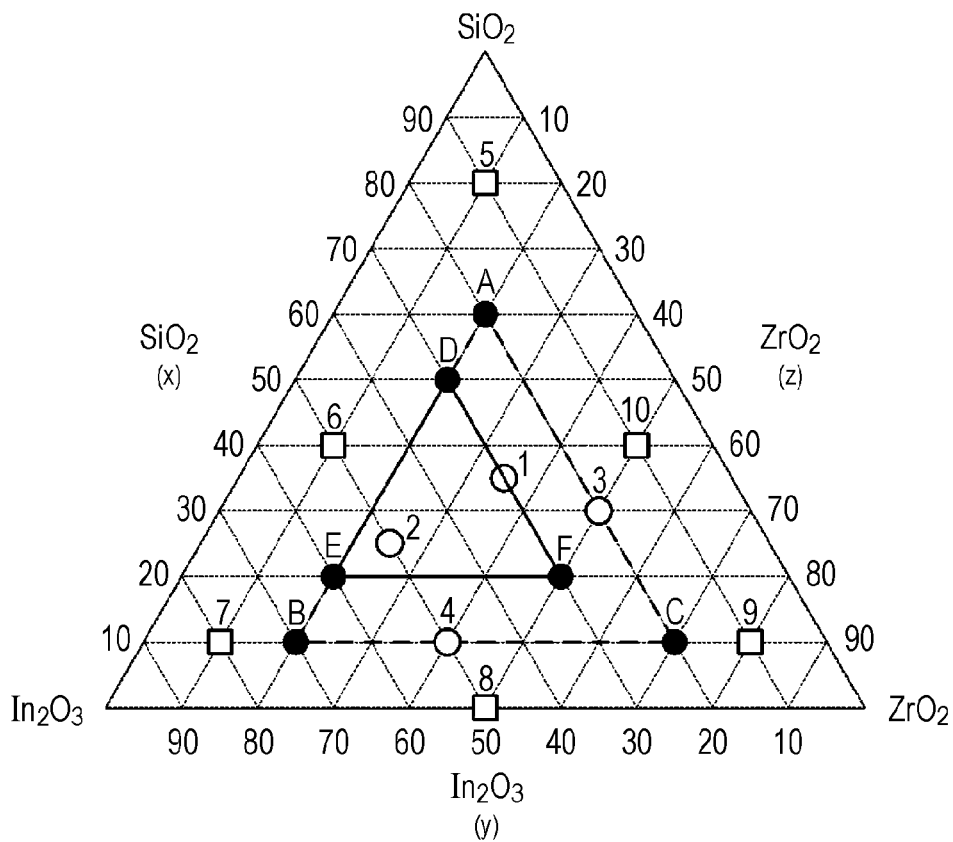
FIG. 8 is a composition diagram of a compound oxide of zirconium oxide, silicon oxide, and indium oxide (SIZ) contained in a second protective layer of write-once optical recording media of Examples 15 to 30.

FIG. 8 is a composition diagram of SIZ contained in the second protective layer of the write-once optical recording media of Examples 15 to 30. In FIG. 8, the compositions corresponding to Examples 15 to 30 are indicated by symbols of "black circle", "white circle", and "white square".

Table 5 shows the evaluation results of error rates before and after a storage test and the ratio of the error rate after the storage test to the initial error rate of the write-once optical recording media of Examples 15 to 30.

TABLE 5

|  | Coordinate | $SiO_2$ proportion [mol %] | $In_2O_3$ proportion [mol %] | $ZrO_2$ proportion [mol %] | Error rate (Initial) | Error rate (After storage) | Error rate ratio |
| --- | --- | --- | --- | --- | --- | --- | --- |
| Example 15 | A | 60 | 20 | 20 | $7.38 \times 10^{-5}$ | $9.37 \times 10^{-5}$ | 1.27 |
| Example 16 | B | 10 | 70 | 20 | $8.73 \times 10^{-5}$ | $1.13 \times 10^{-4}$ | 1.29 |
| Example 17 | C | 10 | 20 | 70 | $8.91 \times 10^{-5}$ | $1.15 \times 10^{-4}$ | 1.29 |
| Example 18 | D | 50 | 30 | 20 | $7.01 \times 10^{-5}$ | $7.64 \times 10^{-5}$ | 1.09 |
| Example 19 | E | 20 | 60 | 20 | $8.03 \times 10^{-5}$ | $0.88 \times 10^{-4}$ | 1.10 |
| Example 20 | F | 20 | 30 | 50 | $7.89 \times 10^{-5}$ | $8.67 \times 10^{-5}$ | 1.10 |
| Example 21 | 1 | 35 | 30 | 35 | $7.18 \times 10^{-5}$ | $7.86 \times 10^{-5}$ | 1.09 |
| Example 22 | 2 | 25 | 50 | 25 | $7.67 \times 10^{-5}$ | $8.36 \times 10^{-5}$ | 1.09 |
| Example 23 | 3 | 30 | 20 | 50 | $8.11 \times 10^{-5}$ | $1.02 \times 10^{-4}$ | 1.26 |
| Example 24 | 4 | 10 | 50 | 40 | $8.66 \times 10^{-5}$ | $1.10 \times 10^{-4}$ | 1.27 |
| Example 25 | 5 | 80 | 10 | 10 | $7.89 \times 10^{-5}$ | $2.52 \times 10^{-4}$ | 3.19 |
| Example 26 | 6 | 40 | 50 | 10 | $8.11 \times 10^{-5}$ | $1.58 \times 10^{-4}$ | 1.95 |
| Example 27 | 7 | 10 | 80 | 10 | $9.36 \times 10^{-5}$ | $1.78 \times 10^{-4}$ | 1.90 |
| Example 28 | 8 | 0 | 50 | 50 | $9.54 \times 10^{-5}$ | $2.01 \times 10^{-4}$ | 2.11 |
| Example 29 | 9 | 10 | 10 | 80 | $1.02 \times 10^{-4}$ | $3.23 \times 10^{-4}$ | 3.17 |
| Example 30 | 10 | 40 | 10 | 50 | $8.21 \times 10^{-5}$ | $2.28 \times 10^{-4}$ | 2.78 |

Table 5 and FIG. 8 show the following.

When the composition of SIZ of the second protective layer is located in the triangle formed by the black circles of A, B, and C, the error rate ratio can be reduced to 1.30 or less. Here, the area of the triangle formed by the black circles of A, B, and C is represented by $(SiO_2)_x(In_2O_3)_y(ZrO_2)_z$ where $10 \leq x \leq 60$, $20 \leq y \leq 70$, and $20 \leq z \leq 70$, and $x+y+z=100$.

When the composition of SIZ of the second protective layer is located in the triangle formed by the black circles of D, E, and F, the error rate ratio can be reduced to 1.10 or less. Here, the area of the triangle formed by the black circles of D, E, and F is represented by $(SiO_2)_x(In_2O_3)_y(ZrO_2)_z$ where $20 \leq x \leq 50$, $30 \leq y \leq 60$, and $20 \leq z \leq 50$, and $x+y+z=100$.

According to the above results, from the standpoint of improving storage reliability, the second protective layer preferably contains, as a main component, $(SiO_2)_x(In_2O_3)_y(ZrO_2)_z$ where x preferably satisfies $10 \leq x \leq 60$, more preferably $20 \leq x \leq 50$, y preferably satisfies $20 \leq y \leq 70$, more preferably $30 \leq y \leq 60$, z preferably satisfies $20 \leq z \leq 70$, more preferably $20 \leq z \leq 50$, and $x+y+z=100$.

4-3 Examination of Composition $(Sn_2O_3)_x(Ta_2O_5)_y$ of Second Protective Layer Example 31

A write-once optical recording medium was prepared as in Example 1 except that the second protective layer was formed of $(Sn_2O_3)_{20}(Ta_2O_5)_{80}$.

Example 32

A write-once optical recording medium was prepared as in Example 1 except that the second protective layer was formed of $(Sn_2O_3)_{30}(Ta_2O_5)_{70}$.

Example 33

A write-once optical recording medium was prepared as in Example 1 except that the second protective layer was formed of $(Sn_2O_3)_{50}(Ta_2O_5)_{50}$.

Example 34

A write-once optical recording medium was prepared as in Example 1 except that the second protective layer was formed of $(Sn_2O_3)_{70}(Ta_2O_5)_{30}$.

Example 35

A write-once optical recording medium was prepared as in Example 1 except that the second protective layer was formed of $Sn_2O_3$.

Comparative Example 9

A write-once optical recording medium was prepared as in Example 1 except that the second protective layer was formed of $Ta_2O_5$.

(Evaluation of Storage Reliability)

Storage reliability of the write-once optical recording media prepared as described above was evaluated as in Examples 1 to 5 and Comparative Examples 1 to 6. The results are shown in Table 6 and FIG. 9.

Figure 9:
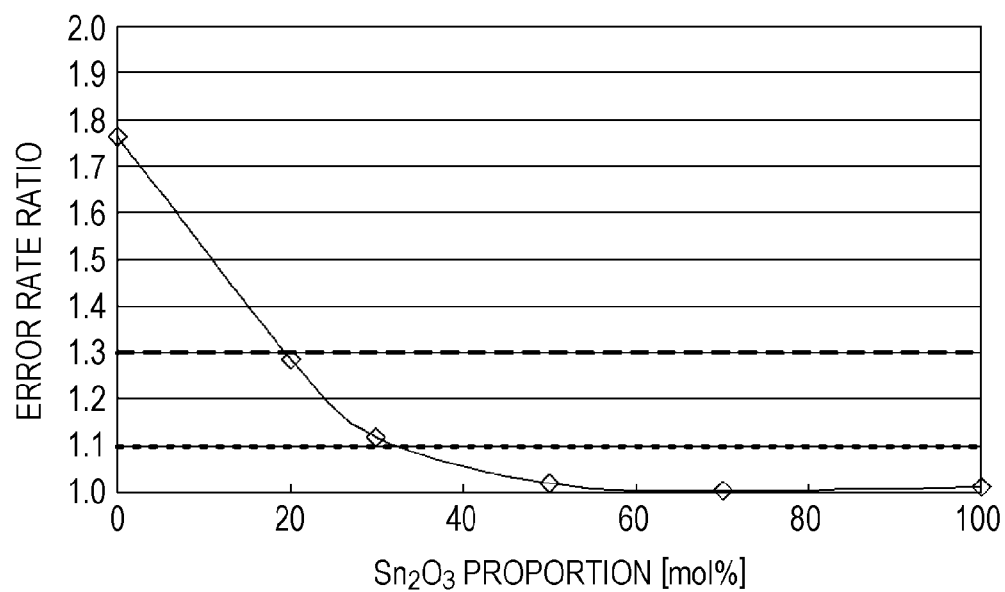
FIG. 9 is a graph showing storage reliability of write-once optical recording media of Examples 31 to 35 and Comparative Example 9.

FIG. 9 is a graph showing storage reliability of the write-once optical recording media of Examples 31 to 35 and Comparative Example 9.

Table 6 shows the evaluation results of error rates before and after a storage test and the ratio of the error rate after the storage test to the initial error rate of the write-once optical recording media of Examples 31 to 35, and Comparative Example 9.

TABLE 6

| | $Sn_2O_3$ proportion [mol %] | $Ta_2O_5$ proportion [mol %] | Error rate (Initial) | Error rate (After storage) | Error rate ratio |
|---|---|---|---|---|---|
| Example 31 | 20 | 80 | $8.81 \times 10^{-5}$ | $1.13 \times 10^{-4}$ | 1.28 |
| Example 32 | 30 | 70 | $8.59 \times 10^{-5}$ | $9.62 \times 10^{-5}$ | 1.12 |
| Example 33 | 50 | 50 | $8.35 \times 10^{-5}$ | $0.85 \times 10^{-4}$ | 1.02 |
| Example 34 | 70 | 30 | $8.12 \times 10^{-5}$ | $8.14 \times 10^{-5}$ | 1.00 |
| Example 35 | 100 | 0 | $7.38 \times 10^{-5}$ | $7.46 \times 10^{-5}$ | 1.01 |
| Comparative Example 9 | 0 | 100 | $9.41 \times 10^{-5}$ | $1.74 \times 10^{-4}$ | 1.85 |

Table 6 and FIG. 9 show the following.

The error rate ratio could be reduced by incorporating tin oxide in the second protective layer. Furthermore, the error rate ratio tended to decrease with an increase in the content of tin oxide in the second protective layer.

When the content of tin oxide was 20% by mole or more, the error rate ratio could be reduced to 1.30 or less. When the content of tin oxide was further increased to 40% by mole or more, the error rate ratio could be reduced to 1.10 or less.

According to the above results, from the standpoint of improving storage reliability, it is preferable to incorporate tin oxide in the second protective layer. The content of tin oxide is preferably 20% by mole or more and 100% by mole or less, and more preferably 40% by mole or more and 100% by mole or less.

5. Examination of Dual-Layer Write-Once Optical Recording Medium

Example 36

A polycarbonate substrate having a thickness of 1.1 mm was formed by injection molding. An uneven surface having grooves was formed on the polycarbonate substrate. Next, a reflective layer, a third protective layer, a heat storage layer, an inorganic recording layer, a first protective layer, and a second protective layer were sequentially stacked on the polycarbonate substrate by a sputtering method to form a first recording layer (L0 layer). The specific configurations of the layers were as follows.

Reflective layer: Ag alloy, 80 nm (average thickness)
Third protective layer: ITO, 15 nm (average thickness)
Heat storage layer: ZnS—$SiO_2$, 12 nm
Inorganic recording layer: $[(ZnS)_{80}(SiO_2)_{20}]_{40}Sb_{60}$, 19 nm (average thickness)
First protective layer: ITO, 13 nm (average thickness)
Second protective layer: $TiO_2$, 5 nm (average thickness)

Each of the layers was formed using a target having a diameter of 200 mm. The Ag alloy layer serving as the reflective layer was deposited by DC sputtering of a target containing Ag as a main component and NdCu in an Ar atmosphere. The ITO layers serving as the first protective layer and the third protective layer were deposited by DC sputtering of an ITO target in an atmosphere containing Ar and $O_2$. The ZnS—$SiO_2$ layer serving as the heat storage layer was deposited by RF sputtering of a ZnS—$SiO_2$ target in an Ar atmosphere. The $[(ZnS)_{80}(SiO_2)_{20}]_{40}Sb_{60}$ layer serving as the inorganic recording layer was deposited by RF sputtering of a $[(ZnS)_{80}(SiO_2)_{20}]_{40}Sb_{60}$ target in an Ar atmosphere. The $TiO_2$ layer serving as the second protective layer was deposited by DC sputtering of a $TiO_2$ target in an atmosphere containing Ar and $O_2$.

Next, the polycarbonate substrate having the first recording layer thereon was set on a spin-coater. An ultraviolet-curable acrylic resin was dropped on the first recording layer while rotating the polycarbonate substrate, and was spin-coated to form a resin layer. Next, a stamper having grooves and lands was placed on the resin layer formed on the first recording layer by spin coating. The resin layer was irradiated with ultraviolet light through the stamper, thus curing the resin layer. The stamper was then detached from the resin layer. Thus, an intermediate layer having a thickness of 25 μm and having grooves, which formed an uneven surface for a second recording layer, was formed.

Next, another third protective layer, another inorganic recording layer, another first protective layer, and another second protective layer were sequentially formed on the intermediate layer by a sputtering method to form the second recording layer (L1 layer). The specific configurations of the layers were as follows.

Third protective layer: ITO, 8 nm (average thickness)
Inorganic recording layer: $[(ZnS)_{80}(SiO_2)_{20}]_{40}Sb_{60}$, 11 nm (average thickness)
First protective layer: ITO, 19 nm (average thickness)
Second protective layer: $TiO_2$, 10 nm (average thickness)

Each of the layers was formed using a target having a diameter of 200 mm. The ITO layers serving as the first protective layer and the third protective layer were deposited by DC sputtering of an ITO target in an atmosphere containing Ar and $O_2$. The $[(ZnS)_{80}(SiO_2)_{20}]_{40}Sb_{60}$ layer serving as the inorganic recording layer was deposited by RF sputtering of a $[(ZnS)_{80}(SiO_2)_{20}]_{40}Sb_{60}$ target in an Ar atmosphere. The $TiO_2$ layer serving as the second protective layer was deposited by DC sputtering of a $TiO_2$ target in an atmosphere containing Ar and $O_2$.

Next, an ultraviolet-curable resin was uniformly applied onto the second protective layer of the second recording layer by a spin-coating method, and this ultraviolet-curable resin was cured by being irradiated with ultraviolet light, thereby forming a light-transmissive layer having a thickness of 75 μl. Thus, a dual-layer write-once optical recording medium was prepared.

(Evaluation of Storage Reliability)

Storage reliability of the dual-layer write-once optical recording medium prepared as described above was evaluated as in Examples 1 to 5 and Comparative Examples 1 to 6. In the first recording layer, the initial error rate was $4.67 \times 10^{-5}$, and the error rate after the storage test was $5.14 \times 10^{-5}$. The ratio of the error rate after the storage test to the initial error rate was 1.10, which was a satisfactory result. In the second recording layer, the initial error rate was $4.11 \times 10^{-5}$, and the error rate after the storage test was $4.36 \times 10^{-5}$. The ratio of the error rate after the storage test to the initial error rate was 1.06, which was a satisfactory result.

According to the above results, it was confirmed that the dual-layer write-once optical recording medium including the two recording layers and the intermediate layer disposed therebetween can also achieve very high storage reliability by combining the first protective layer containing ITO as a main component with the second protective layer containing $TiO_2$ as a main component. It is also believed that, similarly, very high storage reliability can be realized by combining a first protective layer containing ICO or IGO as a main component with a second protective layer containing SIZ or STO as a main component.

6. Examination of Productivity of First Protective Layer and Third Protective Layer In examination of productivity of the materials of the first protective layer and the third protective layer, a possibility of direct-current (DC) sputtering and the degree of nodule generation were examined. Whether a protective layer can be formed by DC sputtering or not depends on the conductivity of the target material of the protective layer. Materials having high conductivity can be subjected to DC sputtering. However, in the case of materials having no conductivity, radio-frequency (RF) sputtering is selected. Specifically, RF sputtering can be employed regardless of the conductivity of the material. However, in general, the sputtering rate of RF sputtering is lower than that of DC sputtering. Accordingly, when a film having a thickness of several tens of nanometers, e.g., the protective layer, is deposited by RF sputtering, the deposition is performed using a plurality of divided cathodes. In such a case, not only the plurality of divided cathodes are necessary but also facilities of RF sputtering are expensive because an RF sputtering apparatus has a complicated structure, resulting in a problem of a decrease in productivity, the problem being caused by a significant increase in the cost. Accordingly, from the standpoint of productivity, DC sputtering is preferable. The term "nodule" refers to a very small projection formed on the surface of a target. It is believed that a nodule is a portion which is not sputtered, the portion being originated from a high-resistance substance. When such a nodule further grows, dielectric breakdown occurs around the nodule, and the nodule adheres to a shield or a disc in the form of a particle. In a portion of the disc to which such a particle has adhered, a groove for guiding a reproduction laser is covered with the particle, and thus the portion is recognized as a disc defect of a tracking servo failure. When the number of such disc defects increases, it is necessary to stop the production and to remove the nodules on the surface of the target, which may become a cause of a decrease in the rate of operation, i.e., degradation of productivity. For this reason, it is preferable to use a target material in which the formation of nodules is suppressed.

Test Example 19

A target of indium oxide to which 20% by mole of gallium oxide was added (($In_2O_3$)$_{80}$($Ga_2O_3$)$_{20}$, hereinafter referred to as $IGO_{20}$) was attached to a DVD-Sprinter deposition apparatus manufactured by Oerlikon. A vacuum chamber of the deposition apparatus was evacuated to a pressure of $5 \times 10^{-7}$ Torr. A mixed gas of 30 sccm of Ar gas and 2 sccm of $O_2$ gas was introduced into the vacuum chamber so that the deposition pressure was controlled to be 0.5 mTorr. Subsequently, the $IGO_{20}$ target was sputtered by direct-current (DC) sputtering at 2 kW. Pinnacle plus manufactured by Advanced Energy Industries Inc. was used as a DC power supply, and the target having a diameter of 200 mm and a thickness of 6 mm was used. This $IGO_{20}$ target could be used for DC sputtering, and a satisfactory sputtering rate of about 7 nm/sec was obtained as in the case of an ITO target. After the use of the target of 30 kWh, the generation of nodules was examined. An area occupancy ratio of nodules per 1 $cm^2$ generated in a non-erosion portion on the target after the use of 30 kWh was defined as the degree of nodule generation. When the degree of nodule generation was 0.2 or less, the target was evaluated as "A". When the degree of nodule generation was more than 0.2, the target was evaluated as "B". When the degree of nodule generation was 0.2 or less, the production could be stably performed without any operation until the end of the target life. When the degree of nodule generation was 0.7 or more, it was necessary to stop the production before the end of the target life and to clean the surface of the target, resulting in the decrease in productivity. The degree of nodule generation of this $IGO_{20}$ target was 0.1, and was evaluated as "A", as shown in Table 7. This target could be used for DC sputtering, and the degree of nodule generation was evaluated as "A". Thus, it was found that this $IGO_{20}$ target is a target material that provides very high productivity.

Test Example 20

A test was performed as in Test Example 19 except that the target material was changed to indium oxide to which 50% by mole of gallium oxide was added (($In_2O_3$)$_{50}$($Ga_2O_3$)$_{50}$, hereinafter referred to as $IGO_{50}$). As shown in Table 7, DC sputtering could be performed with the $IGO_{50}$ target, and the degree of nodule generation was 0.2. Thus, very good results were obtained.

Test Example 21

A test was performed as in Test Example 19 except that the target material was changed to indium oxide to which 15% by mole of cerium oxide was added (($In_2O_3$)$_{85}$($CeO_2$)$_{15}$, hereinafter referred to as $ICO_{15}$). As shown in Table 7, DC sputtering could be performed with the $ICO_{15}$ target, and the degree of nodule generation was 0.0. Thus, very good results were obtained.

Test Example 22

A test was performed as in Test Example 19 except that the target material was changed to indium oxide to which 50% by mole of cerium oxide was added (($In_2O_3$)$_{50}$($CeO_2$)$_{50}$, hereinafter referred to as $ICO_{50}$). As shown in Table 7, DC sputtering could be performed with the $ICO_{50}$ target, and the degree of nodule generation was 0.1. Thus, very good results were obtained.

Test Example 23

A test was performed as in Test Example 19 except that the target material was changed to indium oxide to which 10% by mole of tin oxide was added (ITO). As shown in Table 7, although DC sputtering could be performed with the ITO target, the degree of nodule generation was poor; 0.5. The degree of nodule generation was evaluated as "B". When this ITO target was used in the production, it was necessary to perform an operation of removing nodules several times until the end of the target life. Accordingly, the rate of operation decreased, that is, the productivity was low.

Test Example 24

A test was performed as in Test Example 19 except that the target material was changed to indium oxide to which 10% by mole of gallium oxide was added (($In_2O_3$)$_{90}$($Ga_2O_3$)$_{10}$, hereinafter referred to as $IGO_{10}$). As shown in Table 7, although DC sputtering could be performed with the $IGO_{10}$ target, the degree of nodule generation was poor; 0.5.

Test Example 25

A test was performed as in Test Example 19 except that the target material was changed to indium oxide to which 5% by mole of cerium oxide was added (($In_2O_3$)$_{95}$($CeO_2$)$_5$, hereinafter referred to as $ICO_5$). As shown in Table 7, although DC sputtering could be performed with the $ICO_5$ target, the degree of nodule generation was poor; 0.4.

Test Example 26

A test was performed as in Test Example 19 except that the target material was changed to indium oxide ($In_2O_3$). As shown in Table 7, DC sputtering could not be performed with the $In_2O_3$ target, and the degree of nodule generation was poor; 0.8.

Test Example 27

A test was performed as in Test Example 19 except that the target material was changed to gallium oxide ($Ga_2O_3$). As shown in Table 7, DC sputtering could not be performed with the $Ga_2O_3$ target.

Test Example 28

A test was performed as in Test Example 19 except that the target material was changed to cerium oxide ($CeO_2$). As shown in Table 7, DC sputtering could not be performed with the $CeO_2$ target.

Table 7 shows the results of the possibility of DC sputtering and the evaluation of the degree of nodule generation of Test Examples 19 to 28.

TABLE 7

| | Material of protective layer | Use of DC sputtering power supply | Evaluation of degree of nodule generation | Comprehensive evaluation of productivity |
|---|---|---|---|---|
| Test Example 19 | $(In_2O_3)_{80}(Ga_2O_3)_{20}$ | Possible | A | Good |
| Test Example 20 | $(In_2O_3)_{50}(Ga_2O_3)_{50}$ | Possible | A | Good |
| Test Example 21 | $(In_2O_3)_{85}(CeO_2)_{15}$ | Possible | A | Good |
| Test Example 22 | $(In_2O_3)_{50}(CeO_2)_{50}$ | Possible | A | Good |
| Test Example 23 | ITO | Possible | B | Poor |
| Test Example 24 | $(In_2O_3)_{90}(Ga_2O_3)_{10}$ | Possible | B | Poor |
| Test Example 25 | $(In_2O_3)_{95}(CeO_2)_{5}$ | Possible | B | Poor |
| Test Example 26 | $In_2O_3$ | Not possible | B | Poor |
| Test Example 27 | $Ga_2O_3$ | Not possible | A | Poor |
| Test Example 28 | $CeO_2$ | Not possible | A | Poor |

As shown in the results of Test Examples 19 to 28, in the ITO target, the IGO target whose gallium oxide content was small, and the ICO target whose cerium oxide content was small, nodules tended to be generated. On the other hand, in the indium oxide target, the gallium oxide target, and the cerium oxide target, all of which are not composed of a compound oxide, DC sputtering could not be performed, and thus the sputtering rate was low. Thus, the productivity tended to decrease. Consequently, the materials of the first protective layer and the third protective layer are preferably compound oxides, and the amount of gallium oxide or cerium oxide added to the compound oxides is preferably 15% by mole or more. However, an excessively large amount of gallium oxide or cerium oxide added decreases the sputtering rate, and thus it is preferable to decrease the amount of gallium oxide or cerium oxide to the extent that nodules do not tend to generate. In view of this point, the amount of gallium oxide or cerium oxide added is preferably 75% by mole or less.

Referring to the total results of Test Examples 1 to 18 and Test Examples 19 to 28, from the standpoint of storage reliability and productivity such as nodule resistance, the content of gallium oxide or cerium oxide in the first protective layer and/or the third protective layer is preferably 15% by mole or more and 75% by mole or less, more preferably 15% by mole or more and 65% by mole or less, and still more preferably 15% by mole or more and 40% by mole or less. This is represented by the following composition formula:

$$[(In_2O_3)_{1-x}(A)_x]$$

wherein A represents cerium oxide or gallium oxide, and X preferably satisfies $0.15 \leq X \leq 0.75$, more preferably $0.15 \leq X \leq 0.65$, and still more preferably $0.15 \leq X \leq 0.40$.

Embodiments of the present disclosure have been specifically described above, but the present disclosure is not limited to the above embodiments and various modifications can be made on the basis of the technical idea of the present disclosure.

For example, the numerical values, the materials, the structures, the shapes, and the like described in the above embodiments are only illustrative, and numerical values, materials, structures, and shapes different from those may also be used according to need.

The configurations of the embodiments and Examples described above may be combined with each other without departing from the gist of the present disclosure.

In the embodiments and Examples described above, a description has been made of examples in which the present disclosure is applied to a write-once optical recording medium including a single inorganic recording layer. However, the present disclosure can also be applied to a write-once optical recording medium having two or more inorganic recording layers.

In the embodiments and Examples described above, cases where the present disclosure is applied to a write-once optical recording medium including an inorganic recording layer and a light-transmissive layer disposed on the inorganic recording layer in which recoding or reproduction of an information signal is performed by irradiating the inorganic recording layer with a laser beam from the light-transmissive layer side have been described as examples, but the present disclosure is not limited thereto. For example, the present disclosure can be applied to a write-once optical recording medium including a substrate and an inorganic recording layer disposed on the substrate in which recoding or reproduction of an information signal is performed by irradiating the inorganic recording film with a laser beam from the substrate side or a write-once optical recording medium including two substrates bonded to each other with an inorganic recording layer therebetween in which recoding or reproduction of an information signal is performed by irradiating the inorganic recording layer with a laser beam from a surface side of one of the substrates.

In the embodiments and Examples described above, cases where each layer of a write-once optical recording medium is formed by a sputtering method have been described as examples. However, the method is not limited thereto, and other film deposition methods may also be employed. Examples of the other film deposition methods include CVD methods (chemical vapor deposition: techniques for depositing a thin film from a vapor phase utilizing a chemical reaction) such as thermal CVD, plasma CVD, and photo CVD; and PVD methods (physical vapor deposition: techniques for aggregating a material that is physically vaporized in a vacuum on a substrate to form a thin film) such as vacuum evaporation, plasma-assisted evaporation, sputtering, and ion plating.

In the embodiments and Examples described above, cases where the present disclosure is applied to a write-once optical recording medium have been described as examples, but the present disclosure can also be applied to a rewritable optical recording medium.

The present disclosure contains subject matter related to that disclosed in Japanese Priority Patent Application JP 2010-161092 filed in the Japan Patent Office on Jul. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:
   an inorganic recording layer;
   a first protective layer provided on at least one surface of the inorganic recording layer and containing indium oxide; and
   a second protective layer provided so as to be adjacent to the first protective layer and containing titanium oxide, zirconium oxide, or tin oxide.

2. The optical recording medium according to claim 1, wherein the first protective layer contains, as a main component, a compound oxide of indium oxide and tin oxide, a compound oxide of indium oxide and cerium oxide, or a compound oxide of indium oxide and gallium oxide.

3. The optical recording medium according to claim 1, wherein the content of titanium oxide in the second protective layer is 40% by mole or more and 100% by mole or less.

4. The optical recording medium according to claim 1, wherein the content of zirconium oxide in the second protective layer is 20% by mole or more and 70% by mole or less.

5. The optical recording medium according to claim 1, wherein the content of tin oxide in the second protective layer is 20% by mole or more and 100% by mole or less.

6. The optical recording medium according to claim 1, wherein the second protective layer contains, as a main component, titanium oxide; a compound oxide of zirconium oxide, silicon oxide, and indium oxide; or a compound oxide of tin oxide and tantalum oxide.

7. The optical recording medium according to claim 1, wherein the second protective layer has an average thickness of 2 nm or more and 10 nm or less.

8. The optical recording medium according to claim 1, wherein the first protective layer contains, as a main component, a compound oxide containing indium oxide, and
   the compound oxide is represented by $[(In_2O_3)_{1-x}(A)_x]$ where A represents tin oxide, cerium oxide, or gallium oxide, and X satisfies $0.05 \leq X \leq 0.75$.

9. The optical recording medium according to claim 1, wherein the first protective layer contains, as a main component, a compound oxide containing indium oxide, and
   the compound oxide is represented by $[(In_2O_3)_{1-x}(A)_x]$ where A represents cerium oxide or gallium oxide, and X satisfies $0.15 \leq X \leq 0.75$.

10. The optical recording medium according to claim 1, wherein the inorganic recording layer contains ZnS, $SiO_2$, and Sb as main components.

11. The optical recording medium according to claim 10, wherein the inorganic recording layer further contains at least one element selected from the group consisting of Ga, Te, V, Si, Zn, Ta, Ge, In, Cr, Sn, and Tb.

12. The optical recording medium according to claim 11, wherein the inorganic recording layer has a composition that satisfies formula (1):

$$[(ZnS)_x(SiO_2)_{1-x}]_y(Sb_zX_{1-z})_{1-y} \qquad (1)$$

where $0 < x \leq 1.0$, $0.3 \leq y \leq 0.7$, and $0.8 < z \leq 1.0$, and X is at least one element selected from the group consisting of Ga, Te, V, Si, Zn, Ta, Ge, In, Cr, Sn, and Tb.

13. The optical recording medium according to claim 12, wherein the inorganic recording layer has an average thickness of 3 nm or more and 40 nm or less.

* * * * *